US012758910B2

(12) United States Patent
Deshmane et al.

(10) Patent No.: US 12,758,910 B2
(45) Date of Patent: Oct. 13, 2026

(54) CATALYTICALLY ACTIVE PARTICULATE FILTER BODY AND METHOD OF MAKING

(71) Applicant: CORNING INCORPORATED, Corning, NY (US)

(72) Inventors: Vishwanath Ganpat Deshmane, Chesterbrook, PA (US); Christophe Michel Remy, Canandaigua, NY (US)

(73) Assignee: CORNING INCORPORATED, Corning, NY (US)

( * ) Notice: Subject to any disclaimer, the term of this patent is extended or adjusted under 35 U.S.C. 154(b) by 583 days.

(21) Appl. No.: 18/272,886

(22) PCT Filed: Jan. 14, 2022

(86) PCT No.: PCT/US2022/012418

§ 371 (c)(1),
(2) Date: Jul. 18, 2023

(87) PCT Pub. No.: WO2022/159337

PCT Pub. Date: Jul. 28, 2022

(65) Prior Publication Data

US 2024/0299922 A1 Sep. 12, 2024

Related U.S. Application Data

(60) Provisional application No. 63/139,185, filed on Jan. 19, 2021.

(51) Int. Cl.

*B01D 46/24* (2006.01)
*B01D 53/94* (2006.01)
*B01J 35/00* (2006.01)
*B01J 35/32* (2024.01)
*B01J 35/57* (2024.01)
*B01J 37/02* (2006.01)
*F01N 3/28* (2006.01)

(52) U.S. Cl.

CPC ..... *B01D 46/2455* (2013.01); *B01D 46/2418* (2013.01); *B01D 46/2474* (2013.01);
(Continued)

(58) Field of Classification Search

CPC ............ B01D 46/2418; B01D 46/2455; B01D 46/247; B01D 46/2474; B01D 46/2482;
(Continued)

(56) References Cited

U.S. PATENT DOCUMENTS 6,005,012 A * 12/1999 Hrubesh ............... C01B 33/159 521/181
7,179,430 B1 2/2007 Stobbe et al.
(Continued)

FOREIGN PATENT DOCUMENTS

DE 102018108346 A1 10/2019
EP 2412419 B1 11/2017
(Continued)

OTHER PUBLICATIONS

Chinese Patent Application No. 202280018350.3 , Office Action dated Oct. 28, 2025, 5 pages (English Translation only), Chinese Patent Office.

(Continued)

*Primary Examiner* — Brian A Mccaig
(74) *Attorney, Agent, or Firm* — Kevin M. Able

(57) ABSTRACT

A method is disclosed for making a catalyzed particulate filter with high clean filtration efficiency which may include applying a catalyst material to a filter body having porous filter walls, wherein filtration material comprising filtration particles are disposed on or in or both on and in porous filter walls, and the filtration material is hydrophobic while the catalyst material is applied. A catalyzed particulate filter with high clean filtration efficiency is also disclosed wherein the filter includes porous filter walls with filtration particles disposed on or in or both on and in the porous filter walls, and catalyst material disposed on or in or both on and in the porous filter walls, and wherein the catalyst material substantially does not touch the filtration particles.

6 Claims, 16 Drawing Sheets

(52) U.S. Cl.
CPC ..... *B01D 46/2482* (2021.08); *B01D 46/2484* (2021.08); *B01D 53/9445* (2013.01); *B01J 35/19* (2024.01); *B01J 35/32* (2024.01); *B01J 35/57* (2024.01); *B01J 37/0221* (2013.01); *F01N 3/2828* (2013.01); *B01D 2255/9155* (2013.01); *B01D 2258/01* (2013.01); *B01J 2235/00* (2024.01); *B01J 2235/30* (2024.01); *F01N 2330/06* (2013.01); *F01N 2330/30* (2013.01); *F01N 2370/04* (2013.01); *F01N 2510/063* (2013.01); *F01N 2510/068* (2013.01)

(58) Field of Classification Search
CPC ............ B01D 46/2484; B01D 53/9445; B01D 2255/9155; B01D 2258/01; B01J 35/19; B01J 35/32; B01J 35/57; B01J 37/0215; B01J 37/0219; B01J 37/0221; F01N 3/0222; F01N 3/035; F01N 2330/06; F01N 2330/30
See application file for complete search history.

(56) References Cited

U.S. PATENT DOCUMENTS

| | | | | |
|---|---|---|---|---|
| 2009/0297407 | A1 | 12/2009 | Andy et al. | |
| 2012/0009092 | A1 | 1/2012 | Mizutani et al. | |
| 2012/0124974 | A1 | 5/2012 | Li et al. | |
| 2021/0138447 | A1 | 5/2021 | Deibel et al. | |
| 2023/0191326 | A1 * | 6/2023 | Xue | B01J 37/0009 423/213.5 |

FOREIGN PATENT DOCUMENTS

| | | | | |
|---|---|---|---|---|
| EP | 2174701 | B1 | 6/2019 | |
| JP | 2006-167695 | A | 6/2006 | |
| WO | 2000/001463 | A1 | 1/2000 | |
| WO | 2010/062794 | A1 | 6/2010 | |
| WO | 2018/115900 | A1 | 6/2018 | |
| WO | 2019/197177 | A1 | 10/2019 | |
| WO | 2019/211373 | A1 | 11/2019 | |
| WO | WO-2021262966 | A1 * | 12/2021 | B01D 53/9418 |

OTHER PUBLICATIONS

Furuta et al; "Study on Next Generation Diesel Particulate Filter"; SAE 2009-01-0292; SAE International; 2009; 8 Pages.

Mizutani et al; Performance Verification of Next Generation Diesel Particulate Filter; SAE2010-01-0531; SAE International; 2020; 9 Pages.

Zarvalis et al; "Performance Assessment of a Multi-Functional Reactor Under Conventional and Advanced Combustion Diesel Engine Exhaust Conditions"; SAE 2011-01-0606; SAE International; 2011; 16 Pages.

* cited by examiner

CATALYTICALLY ACTIVE PARTICULATE FILTER BODY AND METHOD OF MAKING

This is a national stage application under 35 U.S.C. § 371 of International Application No. PCT/US2022/012418, filed on Jan. 14, 2022, which claims the benefit of priority under 35 U.S.C. § 119 of U.S. Provisional Application Ser. No. 63/139,185 filed on Jan. 19, 2021, the content of which is relied upon and incorporated herein by reference in their entireties.

TECHNICAL FIELD

Embodiments of the present disclosure generally relate to catalytically active particulate filters, in particular catalytically active particulate filter bodies with high filtration efficiency, and methods of manufacture thereof.

BACKGROUND

Particulate filters, for example, diesel particulate filters and gasoline particulate filters (GPFs), filter particulates from the exhaust stream from engines such as automotive vehicles burning diesel and gasoline fuel, respectively. In various engine exhaust configurations, a catalytically active particulate filter may provide a reduced space requirement and/or increased catalytic performance for exhaust flows.

SUMMARY

In a first aspect, a method is disclosed herein for making a catalyzed particulate filter with high clean filtration efficiency and low pressure drop. In some embodiments, the method comprises applying a catalyst material to a filter body comprising porous filter walls and filtration material comprised of filtration particles disposed on or in or both on and in the porous filter walls, and the filtration material is hydrophobic while the catalyst material is applied to the filter body. In some embodiments, the methods disclosed herein are advantageous to making a filter body with predominantly or mostly in-wall catalyst loading, preferably with little infiltration, and more preferably no infiltration, of catalyst material among the filtration particles.

In a second aspect, a catalyzed particulate filter with high clean filtration efficiency is disclosed herein, wherein the filter comprises porous filter walls comprising filtration particles disposed on or in or both on and in the porous filter walls, and catalyst material disposed on or in or both on and in the porous filter walls, and wherein the catalyst material substantially is not present among the filtration particles. In some embodiments, the filter body is advantageously provided with predominantly or mostly in-wall catalyst loading, preferably with little to no infiltration of catalyst material among the filtration particles.

Additional embodiments of the disclosure are disclosed herein.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

As seen in FIG. 6, at least some catalyst material is coextensive with the filtration particles in addition to the catalyst material being present "in-wall" within the monolithic honeycomb walls such as having been formed by extrusion, for example.

DETAILED DESCRIPTION

Figure 1:
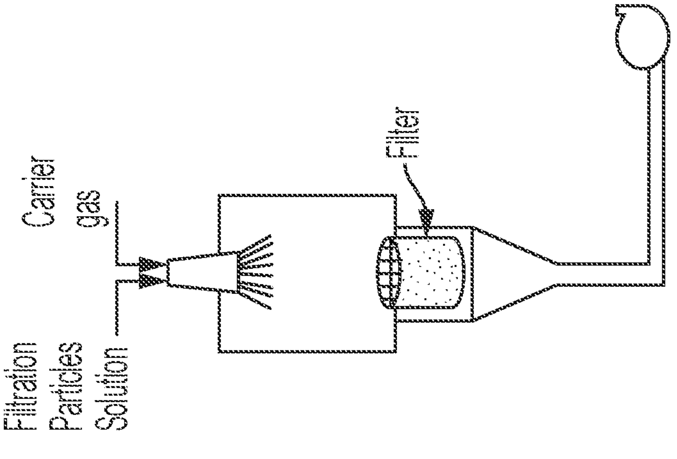
FIG. 1 schematically illustrates an apparatus and method for applying filtration material to a filter body which comprises applying the filtration material (comprising filtration particles) by filtration method.

Before describing several exemplary embodiments of the disclosure, it is to be understood that the disclosure is not limited to the details of construction or process steps set forth in the following description. The disclosure is capable of other embodiments and of being practiced or being carried out in various ways. As used herein, "volume of filter body" or "liter of filter body" refers to the overall volume as calculated by the overall axial length of the filter body multiplied by the area of an end (such as the inlet end) of the filter body (pi/4 times square of outside diameter). As used herein, "filter matrix volume" is equal to the closed frontal area of a honeycomb matrix structure multiplied by the axial length of the honeycomb structure for an unplugged honeycomb structure, such that the closed frontal area is the area occupied by the various honeycomb matrix walls at the inlet end of the honeycomb structure. Also as used herein, "predominantly in-wall" or "mostly in-wall" catalyst loading of a porous wall such as a porous wall of a honeycomb structure refers to the catalyst material being disposed within the porous wall and an on-wall catalyst material thickness of 0 to 25 micrometers thickness at any location on the surface of the wall; thus, a honeycomb structure or matrix comprised of porous walls, like porous ceramic walls, which comprises a "predominantly in-wall" or "mostly in-wall" catalyst loading, may have one or more wall surfaces upon which a 25 micrometer thickness or less of catalyst material, or no catalyst material, is disposed on the surfaces of the walls of the honeycomb matrix, or "on-wall". Preferably for embodiments disclosed herein, there is no on-wall component of catalyst material disposed on gas inlet surfaces of matrix wall surfaces; in some embodiments, there is also no on-wall component of catalyst material (on-wall catalyst material thickness of 0 micrometers) disposed on some, and more preferably all, gas outlet surfaces of matrix wall surfaces, e.g. on second wall surfaces defining outlet channels.

In one set of embodiments, a method is disclosed herein of making a porous ceramic honeycomb filter body, the method comprising: depositing filtration material comprising filtration particles onto porous filter walls of a filter structure, wherein the filter structure comprises a matrix of the filter walls configured as a cellular honeycomb structure comprised of cells wherein surfaces of the filter walls define channels comprising inlet channels and outlet channels extending from an inlet end to an outlet end of the filter structure, wherein the filter structure comprises a first group of plugs disposed within and sealing the inlet channels at or near the outlet end and a second group of plugs disposed within and sealing the outlet channels at or near the inlet end, wherein the porous filter walls comprise opposing first and second wall surfaces and the filtration particles are supported by the filter walls on, in, or both on and in, the first wall surfaces, then, heat treating the filter structure to provide filtration material heat treatment by heating the filter structure to one or more filtration heat treatment temperatures less than or equal to 500° C. and for a time sufficient to reduce hydrophobicity of the filtration material, wherein the filtration material is hydrophobic prior to the depositing and/or hydrophobicity is imparted to the filtration material after the depositing and prior to the heat treating, and depositing catalytic material onto the second surfaces of the porous filter walls, such that the catalytic material is disposed in the filter walls and/or on the second surfaces of the filter walls, wherein the second surfaces define the outlet channels.

In some embodiments, the filtration material exhibits hydrophobicity prior to the depositing.

In some embodiments, the filtration material exhibits hydrophobicity prior to the heat treating.

In some embodiments, a mixture of the filtration particles and a carrier gas are transported through a duct toward the filter body lodged at a downstream end of the duct and into an inlet end of the filter body. In some of these embodiments, the filtration material comprises filtration particles and one or more hydrophobic organic materials. In some of these embodiments, at least one hydrophobic organic material and the filtration particles are mixed prior to being mixed with the carrier gas. In some of these embodiments, the organic material and filtration particles are injected from a nozzle into the carrier gas.

In some embodiments, at least some of the hydrophobicity of the filtration material remains after the filtration material heat treatment.

In some embodiments, the filter structure is heat treated to provide filtration material heat treatment for greater than 0.5 hours and less than 10 hours.

In some embodiments, the method further comprises reducing the hydrophobicity of the filtration material after the catalytic material is deposited.

In some embodiments, the method further comprises eliminating the hydrophobicity of the filtration material after the catalytic material is deposited.

In some embodiments, the method further comprises heat treating the filter structure after the depositing of the catalytic material.

In some embodiments, the method further comprises heat treating the filter structure after the depositing of the catalytic material for a time and at one or more temperatures sufficient to calcine the catalytic material.

In some embodiments, the depositing catalytic material comprises depositing successive loads of catalytic material. In some of these embodiments, the filter structure is heated between the loadings of catalytic material without removing the hydrophobicity of the filtration material.

In some embodiments, the depositing catalytic material comprises depositing successive loadings of catalytic material, wherein the catalytic material is dried between the loadings of catalytic material.

In some embodiments, the method further comprises heat treating the filter structure after a selected amount of catalytic material has been deposited by heating the filter structure to a heat treatment temperature of greater than 500° C. for greater than 1 hour.

In some embodiments, a selected amount of catalytic material is deposited, and wherein the resulting catalyst loading is between 1 and 500 g/liter catalytic material per volume of filter structure.

In some embodiments, the depositing of the catalytic material comprises applying a catalyst material slurry to the second surfaces of the filter walls.

In some embodiments, the filtration material is comprised of inorganic filtration particles and binder material. In some of these embodiments, the binder material exhibits hydrophobicity; in some embodiments, the binder material comprises a silicon containing material; in some embodiments, the binder material comprises a silicone material; in some embodiments, the binder material comprises a silicone resin; in some embodiments, the binder material comprises a siloxane or polysiloxane; in some embodiments, the binder material comprises an alkali siloxane; in some embodiments, the binder material comprises an alkoxysiloxane.

In some embodiments, the filtration particles comprise inorganic nanoparticles; in some embodiments, the inorganic nanoparticles comprise refractory nanoparticles; in some of these embodiments, the refractory nanoparticles are comprised of alumina, aluminum titanate, cordierite, silicon carbide, mullite, spinel, silica, zeolite, zirconia, silicon nitride, zirconium phosphate, or combinations thereof.

In some embodiments, the filtration material comprises agglomerates comprised of inorganic nanoparticles and a binder material which exhibits hydrophobicity.

In some embodiments, the filtration particles are not hydrophobic, and hydrophobicity is imparted to the filtration material prior to the depositing of the catalytic material.

In some embodiments, the filtration particles are not hydrophobic, and hydrophobicity is imparted to the filtration material by mixing the filtration particles with a hydrophobic material prior to the depositing of the catalytic material. In some of these embodiments, the hydrophobic material comprises a hydrophobic organic material.

In another set of embodiments, a method is disclosed herein of making a porous ceramic honeycomb filter body comprising: depositing filtration material comprising filtration particles onto porous filter walls of a filter structure, wherein the filtration material is disposed on or in the filter walls and the filtration material is hydrophobic, and wherein the filter structure comprises a matrix of the filter walls configured as a cellular honeycomb structure comprised of cells wherein surfaces of the filter walls define channels comprising inlet channels and outlet channels extending from an inlet end to an outlet end of the filter structure, wherein the filter structure comprises a first group of plugs disposed within and sealing the inlet channels at or near the outlet end and a second group of plugs disposed within and sealing the outlet channels at or near the inlet end, wherein the porous filter walls comprise opposing first and second wall surfaces and the filtration material is supported by the filter walls on, in, or both on and in, the first wall surfaces, then, heat treating the filter structure to provide filtration material heat treatment by heating the filter structure to one or more filtration heat treatment temperatures and preserving at least some hydrophobicity of the filtration particles, then, depositing catalytic material onto the second surfaces of the porous filter walls, such that the catalytic material is disposed in the filter walls and/or on the second surfaces of the filter walls while the filtration material is hydrophobic, wherein the second surfaces define the outlet channels.

In another set of embodiments, a filter body is disclosed herein comprising a porous honeycomb structure comprised of porous filter walls, filtration particles supported by the porous filter walls, and catalytic material, wherein the structure comprises a matrix of the filter walls having an average wall thickness WT (in mils) and configured as a cellular honeycomb structure comprised of cells having a cell density of CD (cells per square inch), wherein surfaces of the filter walls define channels comprising inlet channels and outlet channels extending from an inlet end to an outlet end of the filter structure, wherein the filter body has an effective diameter D (in inches) and a length L (in inches) extending in an axial direction from the inlet end to the outlet end, wherein the filter structure comprises a first group of plugs disposed within and sealing the inlet channels at or near the outlet end and a second group of plugs disposed within and sealing the outlet channels at or near the inlet end, wherein the porous filter walls comprise opposing first and second wall surfaces, and wherein the filtration particles are disposed in the filter walls and/or on the filter walls at or near the first wall surfaces, wherein the catalytic material is disposed in the porous filter walls and/or on the second surfaces of the porous filter walls, and the catalyst material has a bulk density (BD) in (g/$m^3$ of filter matrix volume), wherein the catalyst loading is disposed predominantly in-wall within the filter walls, wherein the second surfaces define the outlet channels, and wherein the filter body has a clean filtration efficiency at 0.0 particulate loading of greater than 80% normalized to a reference filter body having a reference cell density of 300 cells per square inch and a reference average wall thickness of 8 mils.

In some embodiments, the filter body has a normalized clean filtration efficiency of greater than 85% at 0.0 particulate loading.

In some embodiments, the filter body has a normalized clean filtration efficiency of greater than 90% at 0.0 particulate loading.

In some embodiments, the filter body has a catalyst loading of 150 to 200 g/L of catalyst material per filter matrix volume, the filter body exhibits a normalized clean filtration efficiency at 0.0 g/L particulate loading of greater than 92%, and the filter body exhibits a normalized clean pressure drop at 0.0 g/L of less than 2.81 kPa.

In some embodiments, the filter body has a catalyst loading of 200 to 350 g/L of catalyst material per filter matrix volume, the filter body exhibits a normalized clean filtration efficiency at 0.0 g/L particulate loading of greater than 88%, and the filter body exhibits a normalized clean pressure drop at 0.0 g/L of less than 3.24 kPa.

In some embodiments, the filter body has a catalyst loading of 350 to 580 g/L of catalyst material per filter matrix volume, the filter body exhibits a normalized clean filtration efficiency at 0.0 g/L particulate loading of greater than 85%, and the filter body exhibits a normalized clean pressure drop at 0.0 g/L of less than 3.60 kPa.

In some embodiments, the walls of the matrix are configured to define 300 cells per square inch in an axial cross section of the honeycomb structure; the filter walls have an average thickness of 8 mils (203 micrometers); the filter body has a catalyst loading of greater than 350 g/L of catalyst material per filter matrix volume, the filter body exhibits a normalized clean filtration efficiency at 0.0 g/L particulate loading of greater than 85%, and the filter body exhibits a normalized clean pressure drop at 0.0 g/L of less than 3.24 kPa.

In some embodiments, the filter body has a catalyst loading of 150 to200 g/L of catalyst material per filter matrix volume, the filter body exhibits a normalized clean filtration efficiency at 0.0 g/L particulate loading of greater than 94%, and the filter body exhibits a normalized clean pressure drop at 0.0 g/L of less than 2.6 kPa.

In some embodiments, the filter body has a catalyst loading of 200 to 350 g/L of catalyst material per filter matrix volume, the filter body exhibits a normalized clean filtration efficiency at 0.0 g/L particulate loading of greater than 90%, and the filter body exhibits a normalized clean pressure drop at 0.0 g/L of less than 3.02 kPa.

In some embodiments, the filter body has a catalyst loading of 350 to 580 g/L of catalyst material per filter matrix volume, the filter body exhibits a normalized clean filtration efficiency at 0.0 g/L particulate loading of greater than 88%, and the filter body exhibits a normalized clean pressure drop at 0.0 g/L of less than 3.40 kPa.

In some embodiments, the walls of the matrix are configured to define 300 cells per square inch in an axial cross section of the honeycomb structure; the filter walls have an average thickness of 8 mils (203 micrometers); the filter body has a catalyst loading of greater than 350 g/L of catalyst material per filter matrix volume, the filter body exhibits a clean filtration efficiency at 0.0 g/L particulate loading of greater than 88%, and the filter body exhibits a clean pressure drop at 0.0 g/L of less than 3.0 kPa.

In some embodiments, the catalytic material is present at a catalyst loading of 40 to 50 g/L of filter body, wherein the filter body exhibits a normalized clean filtration efficiency at 0.0 g/L particulate loading of greater than 92%, and wherein the filter body exhibits a normalized pressure drop at 0.5 g/L particulate loading which is less than 115% of its normalized pressure drop at 0.0 g/L particulate loading.

In some embodiments, the catalytic material is present at a catalyst loading of 150 to 200 g/L of filter matrix volume, wherein the filter body exhibits a normalized clean filtration efficiency at 0.0 g/L particulate loading of greater than 92%, and wherein the filter body exhibits a normalized pressure drop at 0.5 g/L particulate loading which is less than 115% of its normalized pressure drop at 0.0 g/L particulate loading.

In some embodiments, the catalytic material is present at a catalyst loading of 200 to 350 g/L of filter matrix volume, wherein the filter body exhibits a normalized clean filtration efficiency at 0.0 g/L particulate loading of greater than 88%, and wherein the filter body exhibits a normalized pressure drop at 0.5 g/L particulate loading which is less than 120% of its normalized pressure drop at 0.0 g/L particulate loading.

In some embodiments, the catalytic material is present at a catalyst loading of 350 to 580 g/L of filter matrix volume, wherein the filter body exhibits a normalized clean filtration efficiency at 0.0 g/L particulate loading of greater than 85%, and wherein the filter body exhibits a normalized pressure drop at 0.5 g/L particulate loading which is less than 125% of its normalized pressure drop at 0.0 g/L particulate loading.

In some embodiments, the catalytic material is present at a catalyst loading of greater than 350 g/L of filter matrix volume, wherein the filter body exhibits a clean filtration efficiency at 0.0 g/L particulate loading of greater than 85%, and wherein the filter body exhibits a pressure drop at 0.5 g/L particulate loading which is less than 125% of its pressure drop at 0.0 g/L particulate loading.

In some embodiments, the catalytic material is present at a catalyst loading of 150 to 200 g/L of filter matrix volume, wherein the filter body exhibits a clean filtration efficiency at 0.0 g/L particulate loading of greater than 94%, and wherein the filter body exhibits a normalized pressure drop at 0.5 g/L particulate loading which is less than 110% of its normalized pressure drop at 0.0 g/L particulate loading.

In some embodiments, the catalytic material is present at a catalyst loading of 200 to 350 g/L of filter matrix volume, wherein the filter body exhibits a normalized clean filtration efficiency at 0.0 g/L particulate loading of greater than 90%, and wherein the filter body exhibits a normalized pressure drop at 0.5 g/L particulate loading which is less than 115% of its normalized pressure drop at 0.0 g/L particulate loading.

In some embodiments, the catalytic material is present at a catalyst loading of 350 to 580 g/L of filter matrix volume, wherein the filter body exhibits a normalized clean filtration efficiency at 0.0 g/L particulate loading of greater than 88%, and wherein the filter body exhibits a normalized pressure drop at 0.5 g/L particulate loading which is less than 120% of its normalized pressure drop at 0.0 g/L particulate loading.

In another set of embodiments, a method is disclosed herein of making a filter body, such as a porous ceramic honeycomb filter body, the method comprising: depositing filtration material onto porous filter walls of a filter structure, wherein the filtration material exhibits hydrophobicity, and wherein the filter structure comprises a matrix of the filter walls configured as a cellular structure, such as a honeycomb structure, comprised of cells wherein surfaces of the filter walls define channels comprising inlet channels and outlet channels, wherein the inlet and outlet channels are thus configured to accommodate flow of a fluid such as an exhaust gas stream carrying particulates into some of the channels and fluid flow out of some of the channels, the channels extending from an inlet end to an outlet end of the filter structure, wherein the filter structure comprises a first group of plugs disposed within and sealing the inlet channels at or near the outlet end and a second group of plugs disposed within and sealing the outlet channels at or near the inlet end, wherein the porous filter walls comprise opposing first and second wall surfaces and the filtration particles are supported by the filter walls in the filter walls and/or on the wall surfaces, for example at or near or proximate the first wall surfaces, then heat treating the filter structure to provide filtration material heat treatment by heating the filter structure to one or more filtration heat treatment temperatures less than 500° C., in some embodiments between 200° C. and 500° C., in some embodiments between 300° C. and 500° C., in some embodiments between 350 and 400° C., for example for 0.1 to 3.0 hours, or 0.1 to 2.0 hours, or 0.5 to 1.5 hours; in some embodiments the temperatures are between 450 and 500° C. for 0.1 to 2.0 hours, in some embodiments the temperatures are between 475 and 495° C. for 0.1 to 0.3 hours, in a manner which preferably tends to preserve or maintain at least some hydrophobicity of the filtration material; then depositing catalytic material onto the second surfaces of the porous filter walls, such that the catalytic material is disposed in the filter walls and/or on the second surfaces of the filter walls, wherein the second surfaces define the outlet channels.

In some embodiments, the hydrophobicity, or at least some of the hydrophobicity, of the filtration material remains after the filtration material heat treatment.

In some embodiments, the filter structure is heat treated to provide filtration material heat treatment for less than 10 hours, and in some embodiments 0.1 to 5 hours, in some embodiments 0.1 to 4 hours, in some embodiments 0.1 to 3 hours, in some embodiments 0.1 to 2 hours, in some embodiments 0.1 to 1.5 hours, and in some embodiments 0.5 to 1.5 hours, such as approximately 1 hour.

The method further preferably comprises reducing the hydrophobicity of the filtration material after the catalytic material is deposited. In some embodiments, the method comprises reducing, removing or essentially eliminating the hydrophobicity of the filtration material after the catalytic material is deposited. In some embodiments, the reduction in hydrophobicity comprises heat treating the filter structure after the depositing of the catalytic material; in some embodiments the method comprises heat treating the filter structure after the depositing of the catalytic material until the hydrophobicity of the filtration material is reduced; in some embodiments, the method comprises heat treating the filter structure after the depositing of the catalytic material until the hydrophobicity of the filtration material is reduced or preferably removed.

In some embodiments, the method further comprises heat treating the filter structure after the depositing of the catalytic material for a time and at one or more temperatures sufficient to calcine the catalytic material.

In some embodiments, the depositing catalytic material comprises depositing successive loads of catalytic material onto the filter body. In some embodiments, the depositing catalytic material comprises depositing successive loadings of catalytic material, wherein the filter structure is heated between the loadings of catalytic material. In some embodiments, the depositing catalytic material comprises depositing successive loadings of catalytic material, wherein the filter structure is heated between the loadings of catalytic material without removing, or without substantially reducing the hydrophobicity of the filtration material; in some of these embodiments, the heating of the filter structure reduces hydrophobicity of the wall itself without substantially affecting the hydrophobicity of the filtration material. In some embodiments, the depositing catalytic material comprises depositing successive loadings of catalytic material, wherein the catalytic material is dried between the loadings of catalytic material. In some embodiments, the depositing catalytic material comprises depositing successive loadings of catalytic material, wherein the catalytic material is dried between the loadings of catalytic material without removing or without substantially reducing the hydrophobicity of the filtration material.

In some embodiments, the depositing catalytic material comprises depositing successive loadings of catalytic material, and in some of these embodiments, the filter structure is heat treated between the loadings of catalytic material.

In some embodiments wherein the method comprises a plurality of loadings of catalytic material, the method further comprises between the loadings of catalytic material the filter structure is heated to a drying temperature which does not exceed 200° C., and in some embodiments does not exceed 150° C., and in some embodiments does not exceed 120° C., and in some embodiments does not exceed 110° C., and in some embodiments does not exceed 100° C. in some embodiments, the filter structure is exposed to a heated environment having a drying temperature which does not exceed 200° C., and in some embodiments does not exceed 150° C., and in some embodiments does not exceed 120° C., and in some embodiments does not exceed 110° C., and in some embodiments does not exceed 100° C.

In some embodiments, the method further comprises heat treating the filter structure after a selected amount of catalytic material has been deposited.

In some embodiments, the method further comprises heat treating the filter structure after a selected amount of catalytic material has been deposited by heating the filter structure to a heat treatment temperature of greater than 300° C., in some embodiments greater than 400° C., in some embodiments greater than 500° C., in some embodiments from 500° C. to 800° C., in some embodiments from 500° C. to 700° C., and in some embodiments from 500° C. to 600° C.

In some embodiments the heat treating reduces the hydrophobicity of the filter particles compared to the hydrophobicity of the filter particles prior to the drying of the catalytic material; in some embodiments, the heat treating reduces the hydrophobicity of the filter particles compared to the hydrophobicity of the filter particles prior to the drying step; in some embodiments, the heat treating reduces the hydrophobicity of the filter particles compared to the hydrophobicity of the filter particles during the depositing of the catalytic material.

In some embodiments, the method further comprises heat treating the filter structure after a selected amount of catalytic material has been deposited by heating the filter structure to a heat treatment temperature of greater than 500° C., in some embodiments greater than 600° C., in some embodiments greater than 700° C., for greater than 1 hour, in some embodiments greater than 2 hours, in some embodiments greater than 3 hours, in some embodiments greater than 4 hours, in some embodiments from 1 to 4 hours, in some embodiments from 1 to 3 hours.

Preferably, a selected amount of catalytic material is deposited. In some embodiments, the selected amount of catalytic material is between 1 and 500 g/liter catalytic material per volume of filter structure.

In some embodiments, the depositing of the catalytic material comprises applying a slurry to the filter structure, the slurry comprising catalytic particles. In some embodiments, the depositing of the catalytic material comprises applying the slurry to the filter walls. In some embodiments, the depositing of the catalytic material comprises applying the slurry to the second surfaces of the filter walls.

In some embodiments, the filtration particles are comprised of inorganic particles and binder material, in some embodiments preferably a hydrophobic binder material. In some embodiments, hydrophobicity can be imparted to the inorganic particles and/or to the binder material, such as after deposition onto the filter part.

In some embodiments, the binder material exhibits hydrophobicity. In some embodiments, the binder material comprises a silicon containing material. In some embodiments, the binder material comprises a silicone material. In some embodiments, the binder material comprises a silicone resin. In some embodiments, the binder material comprises a siloxane or polysiloxane. In some embodiments, the binder material comprises an alkali siloxane. In some embodiments, the binder material comprises an alkoxysiloxane.

In some embodiments, the filtration particles comprise inorganic nanoparticles. In some embodiments, the inorganic nanoparticles comprise refractory nanoparticles. In some embodiments, the refractory nanoparticles are comprised of alumina, aluminum titanate, cordierite, silicon carbide, mullite, spinel, silica, zeolite, zirconia, silicon nitride, zirconium phosphate, and combinations thereof. In some embodiments, the filtration material comprises agglomerates comprised of inorganic nanoparticles, such as agglomerates comprised of inorganic nanoparticles and a binder material which exhibits hydrophobicity. In some embodiments, the filter structure is a honeycomb structure. In some embodiments, the matrix of the filter walls is configured as a honeycomb structure. In some embodiments, the filter body is a porous ceramic honeycomb filter body.

FIG. 1 schematically illustrates an apparatus and method for applying filtration material to a filter body which comprises applying the filtration material by filtration method such as wherein a mixture of a fluid and filtration particles are injected from a nozzle and with a carrier gas are transported through a duct toward a filter body lodged at a downstream end of the duct and into an inlet end of the filter body, wherein the filtration material is deposited on, in, or both on and in the surfaces of the walls of the filter body defining the inlet channels, wherein the carrier gas can pass through the porous walls of the filter body and out through an exit duct, and may be assisted by an exit fan. The particles exiting the nozzle may agglomerate before reaching the filter body such that the filtration material comprises agglomerates of filtration particles, and such agglomerates may further comprise a binder material. The flow of fluid and particles may be heated prior to entry into the filter body.

Figure 2:
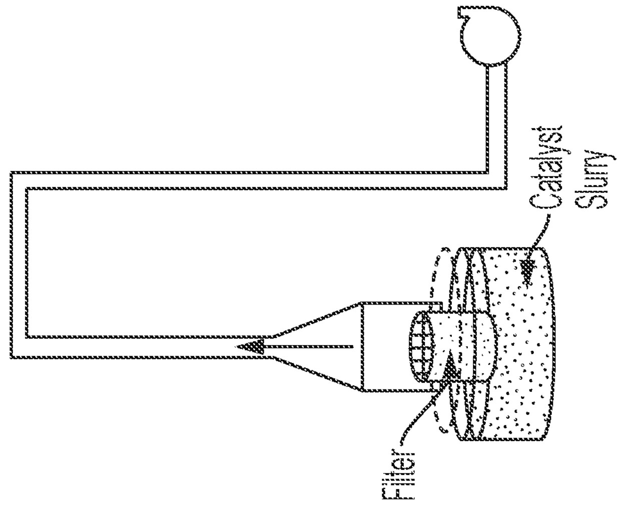
FIG. 2 schematically illustrates an apparatus and method for depositing catalytic material onto the filter walls of a filter body.

FIG. 2 schematically illustrates an apparatus and method for depositing catalytic material onto the filter walls of a filter body, such as by drawing a vacuum on the inlet end of the filter body while the filter body is at least partially immersed in a catalytic material slurry, such as a TWC slurry. The slurry may be drawn into the outlet end of the filter body by vacuum induced by a vacuum pump.

Figure 3:
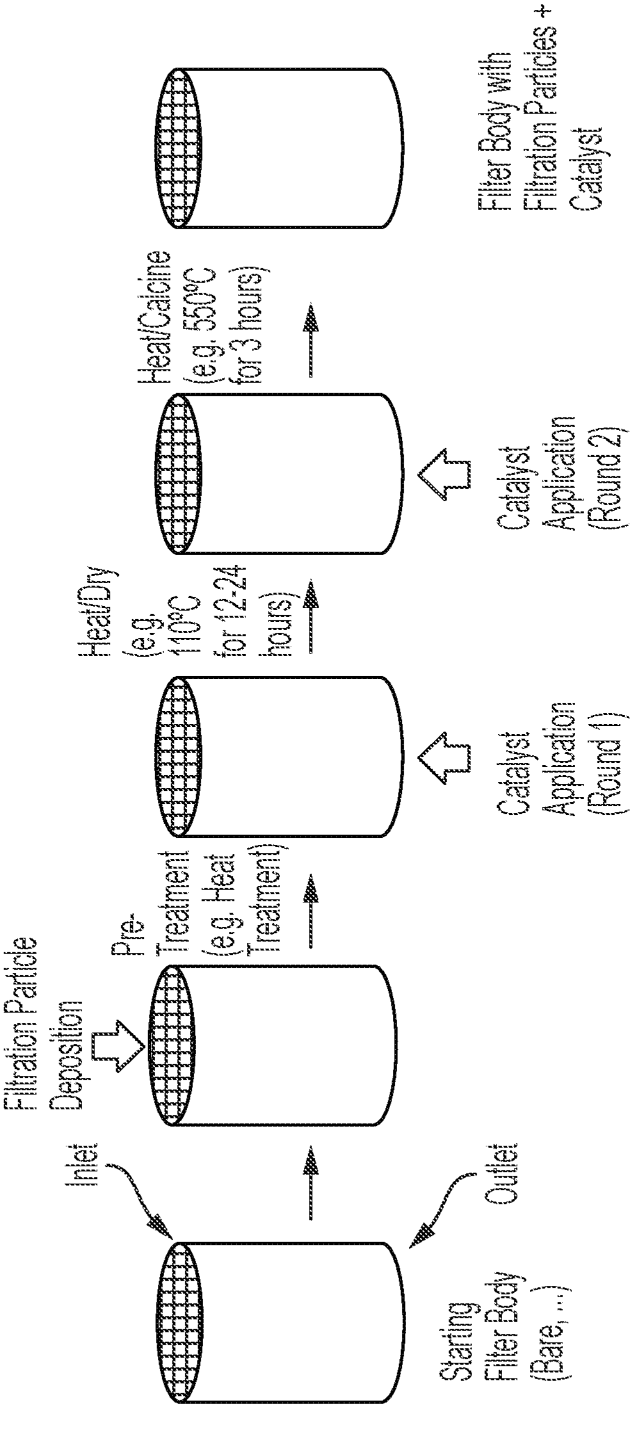
FIG. 3 schematically illustrates method steps disclosed herein which comprise starting with a bare filter body comprised of a plugged honeycomb structure having an inlet and an outlet end, then applying filtration material comprising filtration particles into the inlet end of the filter body to be deposited on inlet surfaces of the filter walls of the honeycomb structure, then performing a pre-treatment on the filter body, such as a heat treatment of the filter body, then loading of catalyst material onto the filter body wherein the catalyst material is introduced into the outlet end of the filter body, then the filter body is subjected to a drying condition, then optionally one or more additional loadings of catalyst material may be introduced into the outlet end of the filter body, and after the last or final loading of catalyst material is applied, the catalyst material is optionally calcined.

FIG. 3 schematically illustrates various method steps as disclosed herein which comprise starting with a bare filter body comprised of a plugged honeycomb structure having an inlet and an outlet end, then applying filtration material into the inlet end of the filter body to be deposited on inlet surfaces of the filter walls of the honeycomb structure, then the filter body undergoes a heat treatment, then a loading of catalyst material is introduced into the outlet end of the filter body, then the filter body is subjected to a drying condition such as being exposed to an environment at a temperature of 110° C. for 12 to 24 hours, then one or more additional loadings of catalyst material may be introduced into the outlet end of the filter body and after the last or final loading of catalyst material is applied, the catalyst material can be calcined by subjecting the filter body to a calcination condition such as being exposed to an environment at a temperature of 550° C. for 2 to 4 hours. The resulting filter body comprises filtration particles disposed on or in or both on and in the cell walls defining inlet channels, and catalytic material disposed on or in or both on and in the cell walls defining outlet channels.

Figure 4:
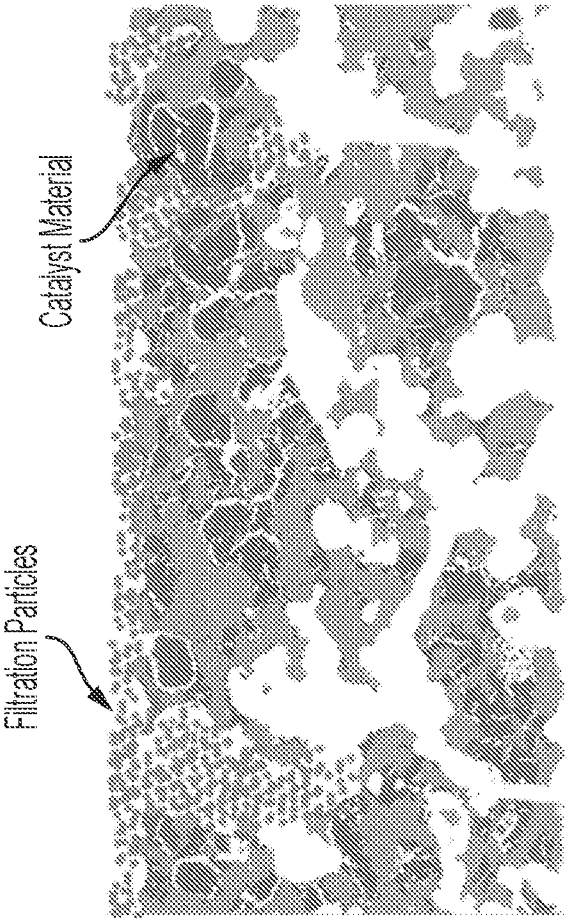
FIG. 4 schematically illustrates an SEM cross section of a filter wall of a filter body comprising a porous ceramic honeycomb structure that has been washcoated with a catalyst material, wherein a porous ceramic portion of the filter wall is shown in medium gray, and catalyst material is shown in dark grey, wherein a distribution of filtration particles were deposited on the cell wall of the washcoated filter body, with filtration particles represented by small solid (generally circular) dots.

FIG. 4 schematically illustrates an SEM cross section of a filter wall of a filter body comprising a porous ceramic honeycomb structure that has been washcoated with a catalyst material. The porous ceramic portion of the filter wall is shown in medium gray, and the catalyst material is shown in dark grey. The catalyst material was applied via slurry, and during the slurry coating process the coating material was driven by capillary force into the cell wall such that the catalytic material (or washcoat) occupies smaller pores while leaving bigger pores open, such that when filtration particles are subsequently deposited, the filtration particles can enter and occupy the bigger pores more freely. A distribution of filtration particles as deposited on the cell wall of the washcoated filter body is illustrated in FIG. 4, with filtration particles represented by small solid (generally circular) dots, which are shown disposed on the cell wall surface for an inlet channel and disposed below that cell wall surface (in-wall). Thus, the filtration particles, in addition to being present on the surface of the inlet side of the filter wall, also occupy the relatively bigger pores of the cell wall and penetrate relatively deeply into the cell wall. Such filtration particle distribution contributes to very high clean and soot loaded pressure drop (deep bed effect).

Figure 5:
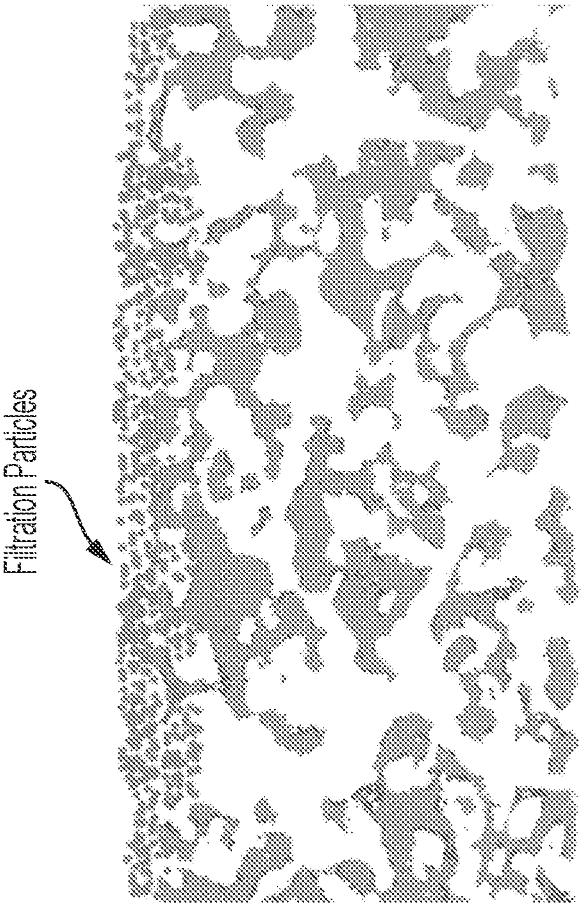
FIG. 5 schematically illustrates an SEM cross section of a filter wall of a filter body comprising a porous ceramic honeycomb structure that has not been washcoated with a catalyst material, with filtration particles represented by small solid (generally circular) dots.

FIG. 5 schematically illustrates an SEM cross section of a filter wall of a filter body comprising a porous ceramic honeycomb structure that has not been washcoated with a catalyst material. The porous ceramic portion of the filter wall is shown in medium gray. A distribution of filtration particles as deposited on the cell wall of the non-washcoated (bare) filter body is illustrated in FIG. 5, with filtration particles represented by small solid (generally circular) dots, which are shown disposed on the cell wall surface for an inlet channel and disposed below that cell wall surface (in-wall). Thus the filtration particles, in addition to being present on the surface of the inlet side of the filter wall, penetrate into the cell wall although to a lesser degree as they do not occupy as much of the bigger pores as compared to FIG. 4, as deposition of the filtration material including the filtration particles onto bare filter bodies tends to be deposited to a more locally uniform depth of penetration.

Figure 6:
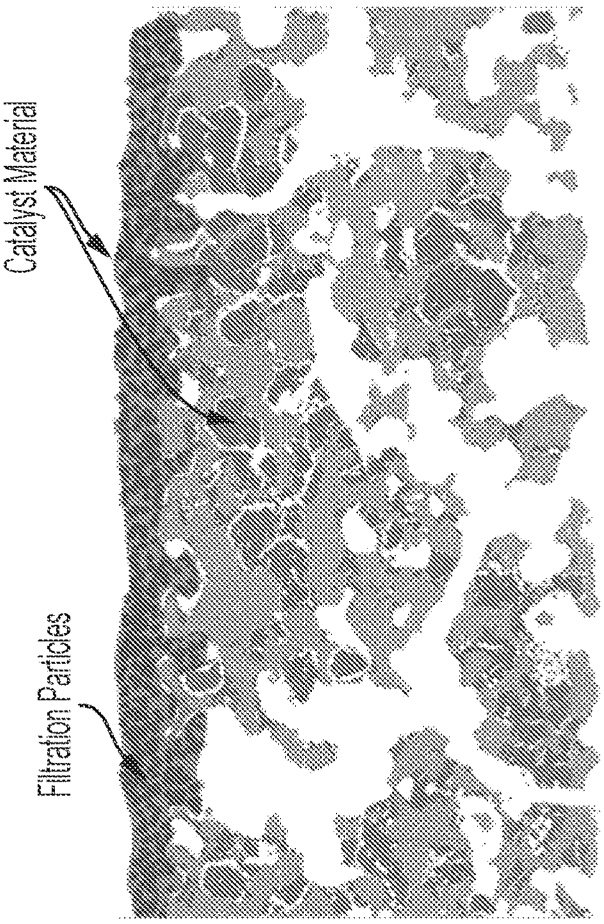
FIG. 6 schematically illustrates the SEM cross section of a filter wall of a filter body comprising a porous ceramic honeycomb structure of FIG. 5 to which a catalyst material has been applied after deposition of filtration material comprising filtration particles but after the filtration material has been exposed to a hydrophobicity-reducing heat treatment (of greater than 500° C.) before application of washcoating with catalyst material such that the filtration material has no hydrophobicity during washcoating.

FIG. 6 schematically illustrates the SEM cross section of a filter wall of a filter body comprising a porous ceramic honeycomb structure of FIG. 5 to which a catalyst material has been applied after deposition of filtration material and after the filtration material has been exposed to a heat treatment of greater than 500° C. before application of washcoating with catalyst material such that the filtration particles have no hydrophobicity during washcoating. The porous ceramic portion of the filter wall is shown in medium gray, and the catalyst material is shown in dark grey. A distribution of filtration particles as deposited on the cell wall of the non-washcoated (bare) filter body is illustrated in FIG. 6, with filtration particles represented by small solid (generally circular) dots, which are shown disposed on the cell wall surface for an inlet channel and disposed below that cell wall surface (in-wall). Thus the filtration particles, in addition to being present on the surface of the inlet side of the filter wall, penetrate into the cell wall although they do not occupy as much of the bigger pores as compared to FIG. 4, as deposition of the filtration material including the filtration particles onto bare filter bodies tends to be deposited to a more locally uniform penetration depth. In addition, the dark grey shading generally surrounding the filtration particles on the inlet side of the cell wall represent the catalyst washcoat material which has filled the filtration deposit portions as preferably the filtration deposits have high porosity which provide high capillary forces that can draw in catalyst washcoat or slurry material into the pores of the filtration deposits which tends to increase the pressure drop of flow through the filter wall and may lead to very high pressure drop through the wall.

Figure 7:
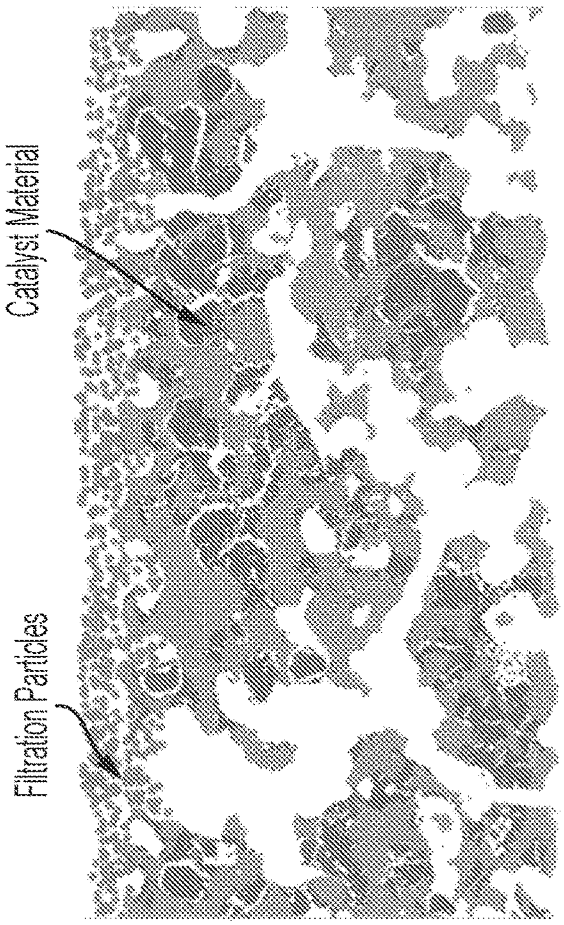
FIG. 7 schematically illustrates the SEM cross section of a filter wall of a filter body comprising a porous ceramic honeycomb structure of FIG. 5 to which a catalyst material has been applied after deposition of filtration material comprising filtration particles but before the filtration material has been exposed to a hydrophobicity-reducing heat treatment (for example being exposed to one or more temperatures less than 500° C., in some embodiments from 300 to 500° C.), that is application of washcoating with catalyst material occurs while the filtration material has hydrophobicity during washcoating.

FIG. 7 schematically illustrates the SEM cross section of a filter wall of a filter body comprising a porous ceramic honeycomb structure of FIG. 5 to which a catalyst material has been applied after deposition of filtration material including filtration particles and after the filtration material (and particles) have been exposed to a heat treatment of less than 500 C, and more specifically being exposed to one or more temperatures from 300 to 500° C., that is application of washcoating with catalyst material occurs while the filtration material has hydrophobicity during washcoating. In some embodiments, the application of washcoating with catalyst material occurs after the filtration particles have been exposed to some heating provided at least some and preferably most of the hydrophobicity is maintained or preserved after the heating. The porous ceramic portion of the filter wall is shown in medium gray, and the catalyst material is shown in dark grey. A distribution of filtration particles as deposited on the cell wall of the non-washcoated (bare) filter body is illustrated in FIG. 7, with filtration particles represented by small solid (generally circular) dots, which are shown disposed on the cell wall surface for an inlet channel and disposed below that cell wall surface (in-wall). Thus the filtration particles, in addition to being present on the surface of the inlet side of the filter wall, penetrate into the cell wall although they do not occupy as much of the bigger pores as compared to FIG. 4, as deposition of the filtration particles onto bare filter bodies tends to be more uniform. The dark grey shading generally surrounding the filtration particles on the inlet side of the cell wall in FIG. 6 is absent because, due to the hydrophobicity of the filtration material comprising filtration particles, the catalyst washcoat material does not fill the filtration deposit portions even though the filtration deposits may have high porosity which provide high capillary forces that could otherwise draw in catalyst washcoat or slurry material into the pores of the filtration deposits. Thus, the high porosity of the filtration deposits can be preserved even after subsequent processing such as heat treatment of the filtration material and/or calcination of the catalyst material.

Figure 8:
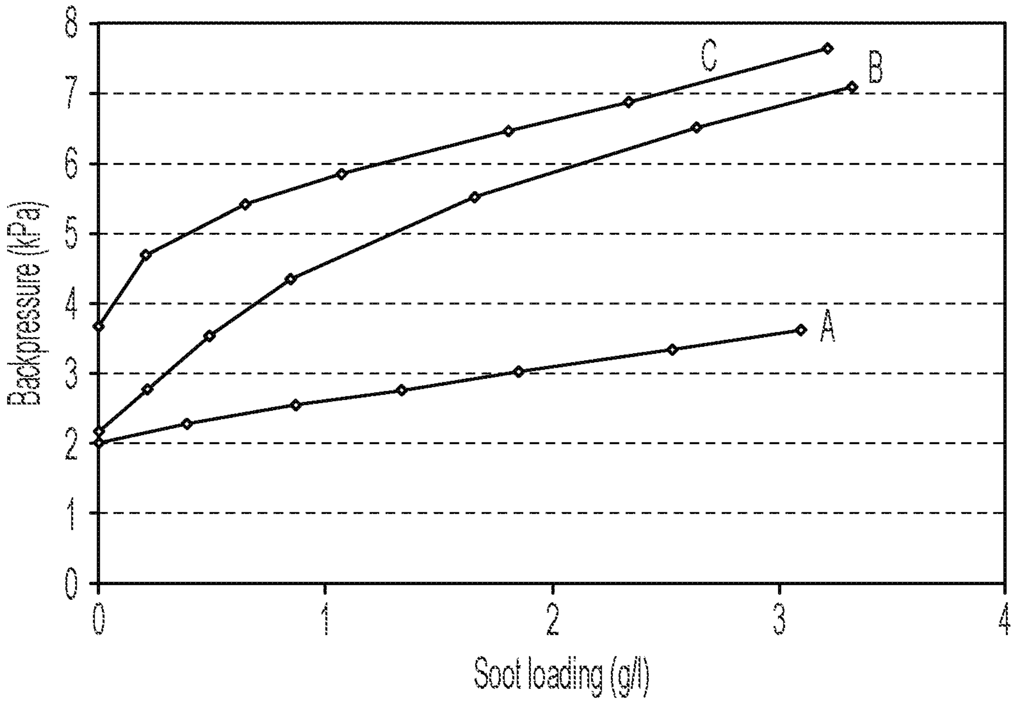
FIG. 8 graphically depicts pressure drop in kPa vs. particulate loading (soot loading) in grams/liter (grams of loading per liter of filter body, or g/l) for: (A) a bare high porosity porous ceramic filter body with no washcoated catalyst material and no filtration particles present in or on the filter body, (B) a filter body with washcoated catalyst material present in or on the filter body and no filtration particles, and (C) a filter body with washcoated catalyst material present in or on the outlet surfaces of the filter body and filtration particles present in or on the inlet surfaces of the filter body, wherein the filtration particles were applied by deposition on an already washcoated (or "catalyzed") filter body with catalyst material (such as illustrated in FIG. 4), and the filtration particles were heat treated (with hydrophobicity removed) subsequent to the wash coating process.

FIG. 8 graphically depicts pressure drop in kPa vs. particulate loading (soot loading) in grams/liter (grams of loading per liter of filter body, or g/l) for: (A) a bare high porosity (about 65% porosity by mercury porosimetry) porous ceramic filter body with no washcoated catalyst material and no filtration particles present in or on the filter body, (B) a filter body with TWC washcoated catalyst material present in or on the filter body in amount of 90 grams per liter of filter body and no filtration particles, and (C) a filter body with TWC washcoated catalyst material present in or on the outlet surfaces of the filter body in amount of 90 grams per liter of filter body, and filtration particles present in or on the inlet surfaces of the filter body, wherein the filtration particles were applied by deposition on an already washcoated (or "catalyzed") filter body with TWC catalyst material, wherein about 2 grams of filtration particles per liter of filter body were present on the filter body, and the filtration particles were heat treated (with hydrophobicity removed). The filter bodies were 4.66 inches in diameter and 4.72 inches long (axially) with 300 cells per square inch (cpsi) and 8 mil thick matrix walls.

Figure 9:
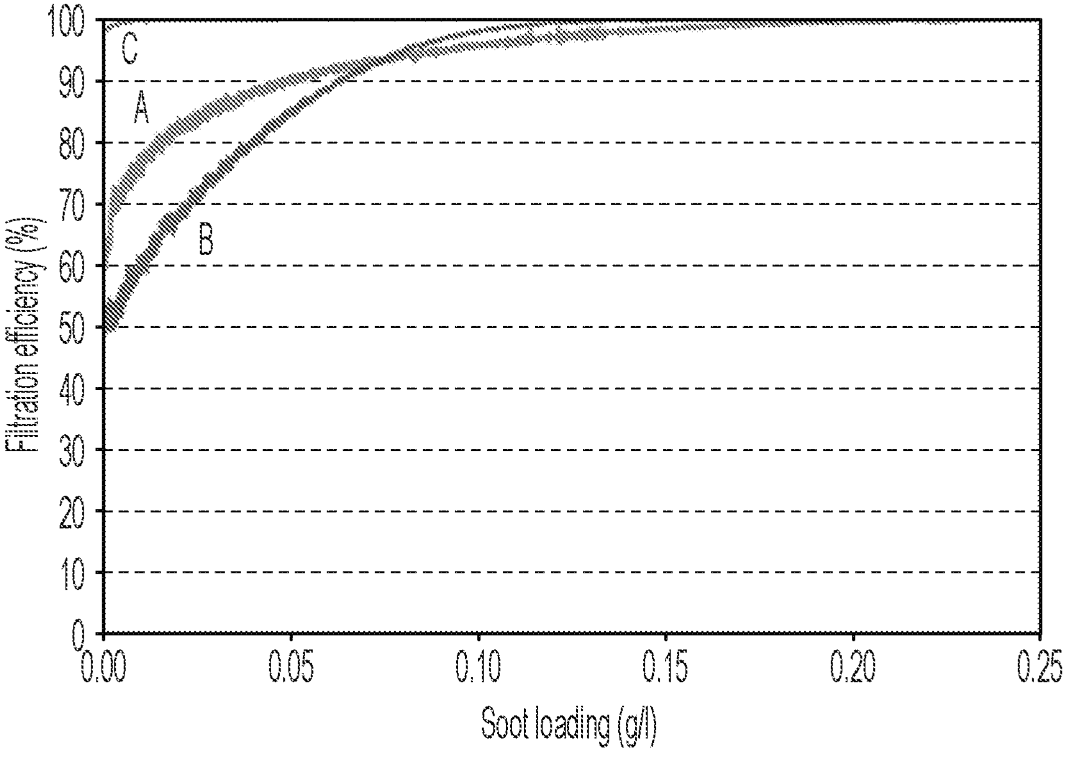
FIG. 9 graphically depicts filtration efficiency in % vs. particulate loading (soot loading) in grams/liter (g/l) corresponding to the filter bodies (A), (B) and (C) of FIG. 8.

FIG. 9 graphically depicts filtration efficiency in % vs. particulate loading (soot loading) in grams/liter (g/l) corresponding to the filter bodies (A), (B) and (C) of FIG. 8.

As seen in FIGS. 8-9, a very high FE (~98%) was obtained with just ~2 g/L of filtration particle loading, the pressure drop penalty was extremely high, with a clean (near 0.0 soot (particulate) loading) dP increase of about 81.8% over bare filter body and 69% over the TWC coated filter body. The dP increase for TWC coated filter body over bare filter body is only about 7.6%. Furthermore, a presence of a significant knee in the soot loaded pressure drop curve ("SLdP knee") suggests a deep bed filtration mechanism which corresponds to higher pressure drop upon increased soot loading.

Figure 10:
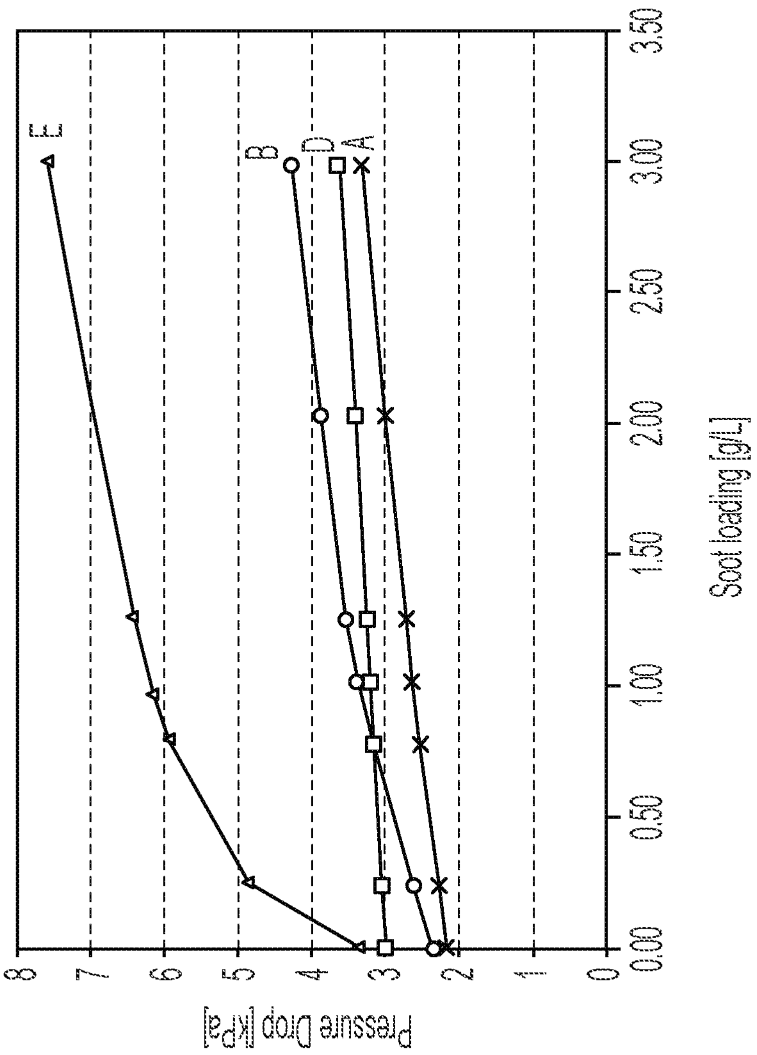
FIG. 10 graphically depicts pressure drop in kPa vs. particulate loading (soot loading) in grams/liter (grams of loading per liter of filter body, or g/l) for: (A) a bare high porosity porous ceramic filter body with no washcoated catalyst material and no filtration particles present in or on the filter body, (B) a filter body with washcoated catalyst material present in or on the filter body in catalyst loading amount of 92 grams per liter of filter body and no filtration particles, and (D) a filter body with filtration particles in an amount of 6.4 grams filtration particles per liter of filter body and no washcoated catalyst material present in or on the filter body, and (E) a filter body with washcoated catalyst material present in or on the outlet surfaces of the filter body in catalyst loading amount of 95 grams per liter of filter body, and filtration particles present in or on the inlet surfaces of the filter body in an amount of 6.4 grams filtration particles per liter of filter body, wherein the washcoat was applied to the filter body already provided with filtration material comprised of filtration particles which were heat treated at temperatures up to 600° C. (that is, a hydrophobicity reducing or hydrophobicity eliminating heat treatment), wherein the filtration material, in this case filtration particles, were not hydrophobic when the washcoat was applied (such as illustrated in FIG. 6), and wherein the TWC material was calcined.

FIG. 10 graphically depicts pressure drop in kPa vs. particulate loading (soot loading) in grams/liter (grams of loading per liter of filter body, or g/l) for: (A) a bare high porosity porous ceramic filter body with no washcoated catalyst material and no filtration particles present in or on the filter body, (B) a filter body with TWC washcoated catalyst material present in or on the filter body in amount of 92 grams per liter of filter body and no filtration particles, and (D) a filter body with filtration particles in an amount of 6.4 grams filtration particles per liter of filter body (filtration particle loading) and no washcoated catalyst material present in or on the filter body, and (E) a filter body with TWC washcoated catalyst material present in or on the outlet surfaces of the filter body in amount of 95 grams per liter of filter body, and filtration particles present in or on the inlet surfaces of the filter body in an amount of 6.4 grams filtration particles per liter of filter body, wherein the TWC washcoat was applied to the filter body already provided with filtration particles which were heat treated at temperatures up to 600° C. (that is, a hydrophobicity reducing or hydrophobicity eliminating heat treatment), wherein the filtration particles were not hydrophobic when the TWC washcoat was applied, and wherein the TWC material was calcined. The filter bodies were 4.66 inches in diameter and 6 inches long (axially) with 300 cells per square inch (cpsi) and 8 mil thick matrix walls.

FIG. 10 illustrates that filter body (E) has a higher clean (at 0.0 soot particulate loading) pressure drop which is 51.8% higher than the clean pressure drop for a bare filter body (A), and filter body (E) has a higher clean (at 0.0 soot particulate loading) pressure drop which is 40.8% higher than the clean pressure drop for a washcoated filter body (B).

FIG. 10 illustrates that filter body (E) has a higher clean (at 0.0 soot particulate loading) pressure drop which is 51.8% higher than the clean pressure drop for a bare filter body (A), and filter body (E) has a higher clean (at 0.0 soot particulate loading) pressure drop which is 40.8% higher than the clean pressure drop for a washcoated filter body (B). Furthermore, a presence of a significant knee in the soot loaded pressure drop curve ("SLdP knee") suggests a deep bed filtration mechanism which corresponds to higher pressure drop upon increased soot loading.

Figure 11:
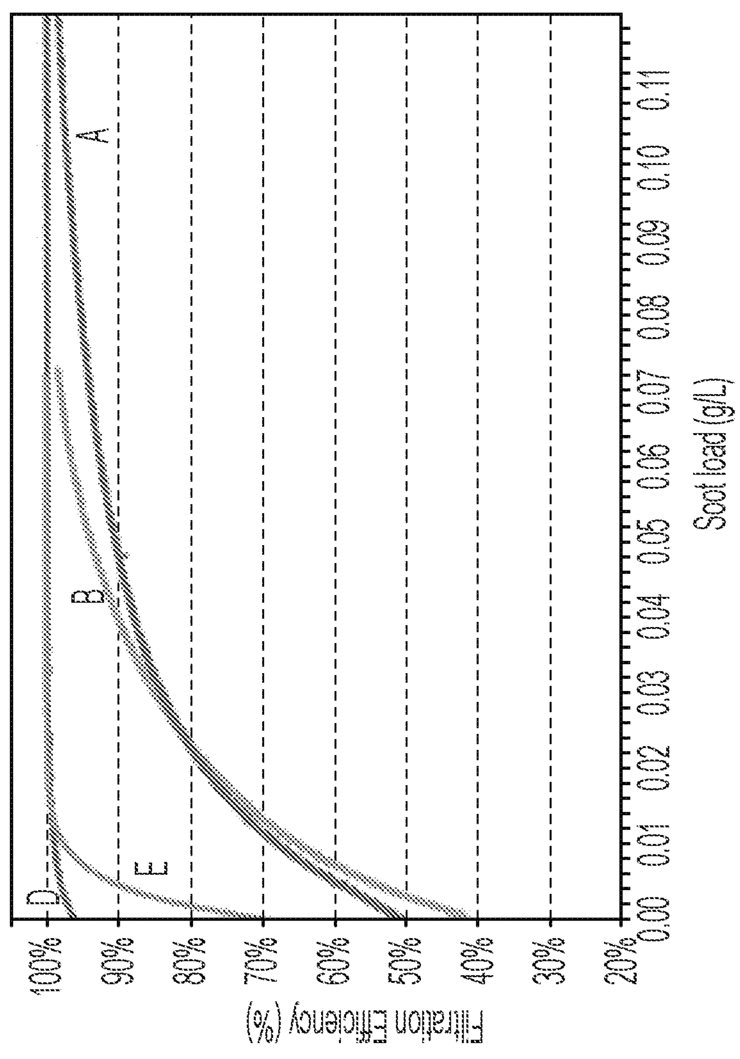
FIG. 11 graphically depicts filtration efficiency in % vs. particulate loading (soot loading) in grams/liter (g/l) corresponding to the filter bodies (A), (B), (D), and (E) of FIG. 10.

FIG. 11 graphically depicts filtration efficiency in % vs. particulate loading (soot loading) in grams/liter (g/l) corresponding to the filter bodies (A), (B), (D), and (E) of FIG. 10.

FIG. 11 illustrates that a filter body with filtration particles after being subjected to a high temperature heat treatment and having no hydrophobicity when the catalyst material is applied to the filter body, a significantly lower clean filtration efficiency ("FE") as provided, for example comparing filter body (D) with 96% clean filtration efficiency to filter body (E) with ~70% clean filtration efficiency.

Figure 12:
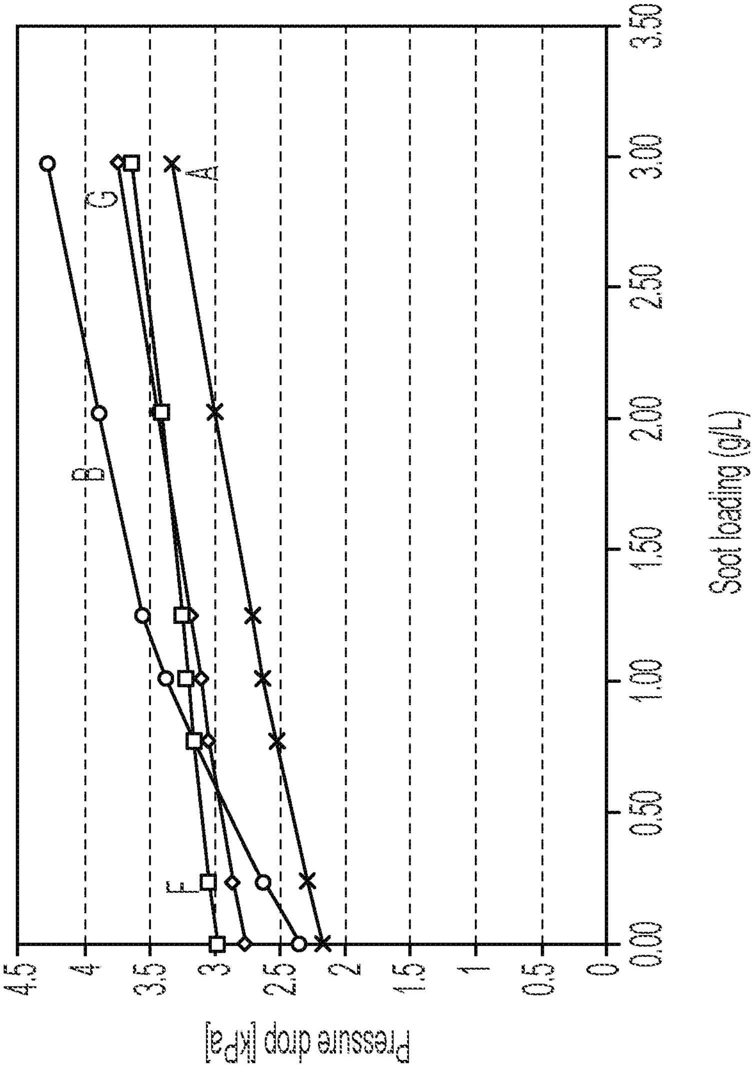
FIG. 12 graphically depicts pressure drop in kPa vs. particulate loading (soot loading) in grams/liter (grams of loading per liter of filter body, or g/l) for: (A) a bare high porosity porous ceramic filter body with no washcoated catalyst material and no filtration particles present in or on the filter body, (B) a filter body with washcoated catalyst material present in or on the filter body and no filtration particles, and (F) a filter body with no washcoated catalyst material present in or on the filter body and filtration particles, and (G) a filter body with washcoated catalyst material present in or on the outlet surfaces of the filter body, and filtration particles present in or on the inlet surfaces of the filter body, wherein the catalyst washcoat was applied to the filter body already provided with filtration material (including filtration particles) which were heat treated in a manner in which hydrophobicity was reduced enough so that the filtration material was hydrophobic when the catalyst washcoat was applied, which is illustrative of preferred embodiments disclosed herein.

FIG. 12 graphically depicts pressure drop in kPa vs. particulate loading (soot loading) in grams/liter (grams of loading per liter of filter body, or g/l) for: (A) a bare high porosity porous ceramic filter body with no washcoated catalyst material and no filtration particles present in or on the filter body, (B) a filter body with TWC washcoated catalyst material present in or on the filter body in catalyst loading amount of 92 grams per liter of filter body and no filtration particles, and (F) a filter body with no washcoated catalyst material present in or on the filter body and filtration particles in an amount of 6.4 grams filtration particles per liter of filter body, and (G) a filter body with TWC washcoated catalyst material present in or on the outlet surfaces of the filter body in amount of 85 grams per liter of filter body, and filtration particles present in or on the inlet surfaces of the filter body in an amount of 7.1 grams filtration particles per liter of filter body, wherein the TWC washcoat was applied to the filter body already provided with filtration particles which were heat treated at temperatures up to 350° C. (that is, a hydrophobicity preserving heat treatment), wherein the filtration material comprising filtration particles was hydrophobic when the TWC washcoat was applied, and wherein the filter body was heat treated at higher temperatures (>550° C.) sufficient to calcine the TWC material, that is, wherein the hydrophobicity of the filtration material comprising filtration particles was removed by calcining after the TWC material was deposited onto or into the filter body. The filter bodies were 4.66 inches in diameter and 6 inches long (axially) with 300 cells per square inch (cpsi) and 8 mil thick matrix walls.

FIG. 12 illustrates that filter body (G) has a higher clean (at 0.0 soot particulate loading) pressure drop which is 27% higher than the clean pressure drop for a bare filter body (A), and filter body (G) has a higher clean (at 0.0 soot particulate loading) pressure drop which is 17.8% higher than the clean pressure drop for a washcoated filter body (B).

FIG. 12 illustrates that filter body G with 7.1 grams filtration particles per liter of filter body after being subjected to a low to moderate temperature hydrophobicity preserving heat treatment (such as a maximum heat treatment temperature of 500° C., i.e. 500° C. or less, more specifically being exposed to one or more temperatures from 200 to 500° C., or in some embodiments 300 to 500° C.) such that the filtration particles had hydrophobicity when catalyst material was applied to the filter body and then subsequently heat treated at higher temperatures >500° C. sufficient to calcine the catalyst material and to remove the hydrophobicity of the filtration particles, there is a 27% higher pressure drop at or near 0.0 particulate loading compared to the pressure drop for filter body A.

Figure 13:
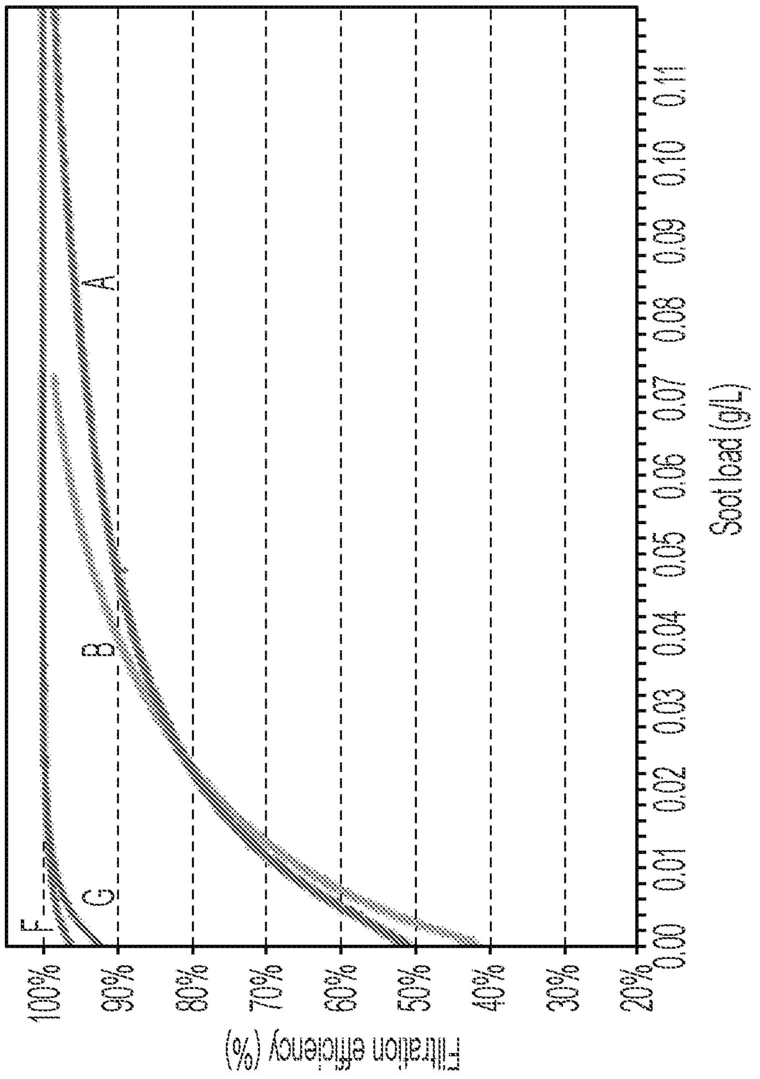
FIG. 13 graphically depicts filtration efficiency in % vs. particulate loading (soot loading) in grams/liter (g/l) corresponding to the filter bodies (A), (B), (F), and (G).

FIG. 13 graphically depicts filtration efficiency in % vs. particulate loading (soot loading) in grams/liter (g/l) corresponding to the filter bodies (A), (B), (F), and (G).

FIG. 13 illustrates that filter body G with 7.1 grams filtration particles per liter of filter body after being subjected to a low to moderate temperature hydrophobicity preserving heat treatment (such as a maximum heat treatment temperature of 350° C.) and having hydrophobicity when catalyst material was applied to the filter body, there is a similar or only slightly lower clean filtration efficiency (92% clean FE for filter body G) compared to filter body F with a loading of 6.4 grams of filtration particles per liter of filter body but without having any catalyst material (96% clean FE for filter body F).

Furthermore, there is almost no knee present in the soot loaded pressure drop curve ("SLdP knee") in embodiments disclosed herein which suggests that a deep bed filtration mechanism which corresponds to higher pressure drop is avoided, and the filtration particles and catalyst material have been processed and are working appropriately. In FIG. 12, filter body B exhibited a ratio of pressure drop at 0.5 g/L soot particulate loading to pressure drop at 0 g/L soot particulate loading of 1.22 indicative of a significant knee. On the other hand, filter body G according to this disclosure exhibited a ratio of pressure drop at 0.5 g/L soot particulate loading to pressure drop at 0 g/L soot particulate loading of only 1.07 indicative of almost no knee. For example in FIG. 12, filter body B exhibited a pressure drop slope of about 0.32 kPa pressure drop per g/l soot loading between 0.00 g/l soot loading and 1.25 g/l soot loading, and a pressure drop slope of about 0.29 kPa pressure drop per g/l soot loading between 1.25 g/l soot loading and 3.0 g/l soot loading, such that the change in pressure drop slope is less than 30%, preferably less than 20%, and more preferably less than 15% (in absolute value) (here about 11%) for soot loadings between 0.00 and 3.00 g/l. In contrast, filter body G had a considerable knee and exhibited a pressure drop slope of about 1.00 kPa pressure drop per g/l soot loading between 0.00 g/l soot loading and 1.25 g/l soot loading, and a pressure drop slope of about 0.4 kPa pressure drop per g/l soot loading between 1.25 g/l soot loading and 3.00 g/l soot loading, such that the change in pressure drop slope was about 40% (absolute value) in the soot loading (g/l) range of 0.00 to 3.00 g/l. Filter bodies disclosed herein such as filter body B in FIG. 12 exhibit a pressure drop slope of less than about 1.00 kPa pressure drop per g/l soot loading for all soot loadings between 0.00 g/soot loading and 3.00 g/l soot loading, preferably less than 0.70 kPa pressure drop per g/l soot loading, more preferably less than 0.50 kPa pressure drop per g/l soot loading, even more preferably less than 0.40 kPa pressure drop per g/l soot loading, and even more preferably less than 0.35 kPa pressure drop per g/l soot loading. Filter bodies disclosed herein such as filter body B in FIG. 12 exhibit a pressure drop slope of less than about 1.00 kPa pressure drop per g/l soot loading for all soot loadings between 0.00 g/l soot loading and 1.00 g/l soot loading, preferably less than 0.70 kPa pressure drop per g/l soot loading, more preferably less than 0.50 kPa pressure drop per g/l soot loading, even more preferably less than 0.40 kPa pressure drop per g/l soot loading, and even more preferably less than 0.35 kPa pressure drop per g/l soot loading.

FIG. 13 corresponds to a filter body comprising a porous honeycomb structure for a filter structure comprised of porous filter walls, wherein the filter structure comprises a matrix of the filter walls configured as a cellular honeycomb structure comprised of cells wherein surfaces of the filter walls define channels comprising inlet channels and outlet channels extending from an inlet end to an outlet end of the filter structure, wherein the filter structure comprises a first group of plugs disposed within and sealing the inlet channels at or near the outlet end and a second group of plugs disposed within and sealing the outlet channels at or near the inlet end, wherein the porous filter walls comprise opposing first and second wall surfaces, wherein the filter walls of the filter structure support filtration particles disposed in the filter walls and/or on the filter walls at or near the first wall surfaces, in some embodiments proximate the first surfaces, and catalytic material disposed in the filter walls and/or on the second surfaces of the porous filter walls, wherein the second surfaces define the outlet channels, wherein the filter body has a clean filtration efficiency at 0.0 particulate loading of greater than 80%, in some embodiments greater than 85%, and in some embodiments greater than 90%, as seen for example in FIG. 13.

Figure 14:
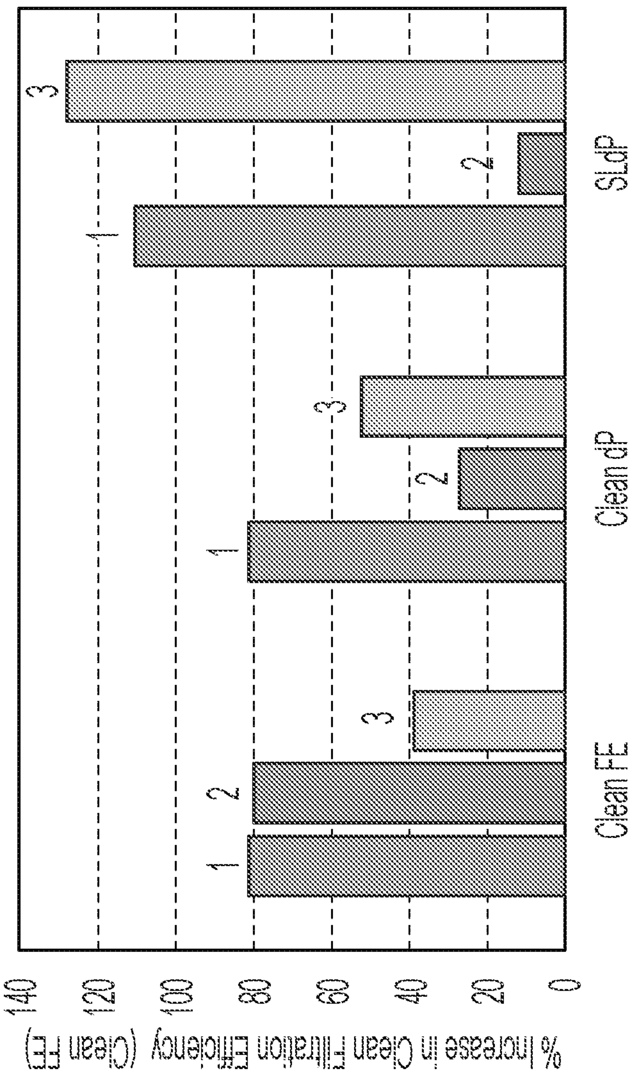
FIG. 14 schematically illustrates the % increase in clean filtration efficiency (first set of bars), clean pressure drop (second set of bars), and particulate/soot loaded pressure drop (third set of bars).

FIG. 14 schematically illustrates the % increase in clean filtration efficiency (first set of bars), clean pressure drop (second set of bars), and particulate/soot loaded pressure drop (third set of bars) over bare filter body, wherein the first bar in each set corresponds to a filter body (1) coated via outlet channels with TWC catalyst material with loading 90 g/l followed by filtration particle loading via inlet channels of 2 g/l, (2) filtration particle loading of 7.1 g/l via inlet channels which was then heat treated at 350° C., followed by application of TWC catalyst coating via outlet channels at a loading of 85 g/l, and (3) filtration particle loading of 7.1 g/l via inlet channels which was then heat treated at 600° C., followed by application of TWC catalyst coating via outlet channels at a loading of 85 g/l. FIG. 14 illustrates that both higher clean filtration efficiency and lower pressure drop is associated with application of hydrophobic filtration material comprising filtration particles, followed by heat treatment at temperatures low enough to preserve at least some hydrophobicity, then followed by application of catalytic material via washcoat while filtration material comprising filtration particles are hydrophobic.

Figure 15A:
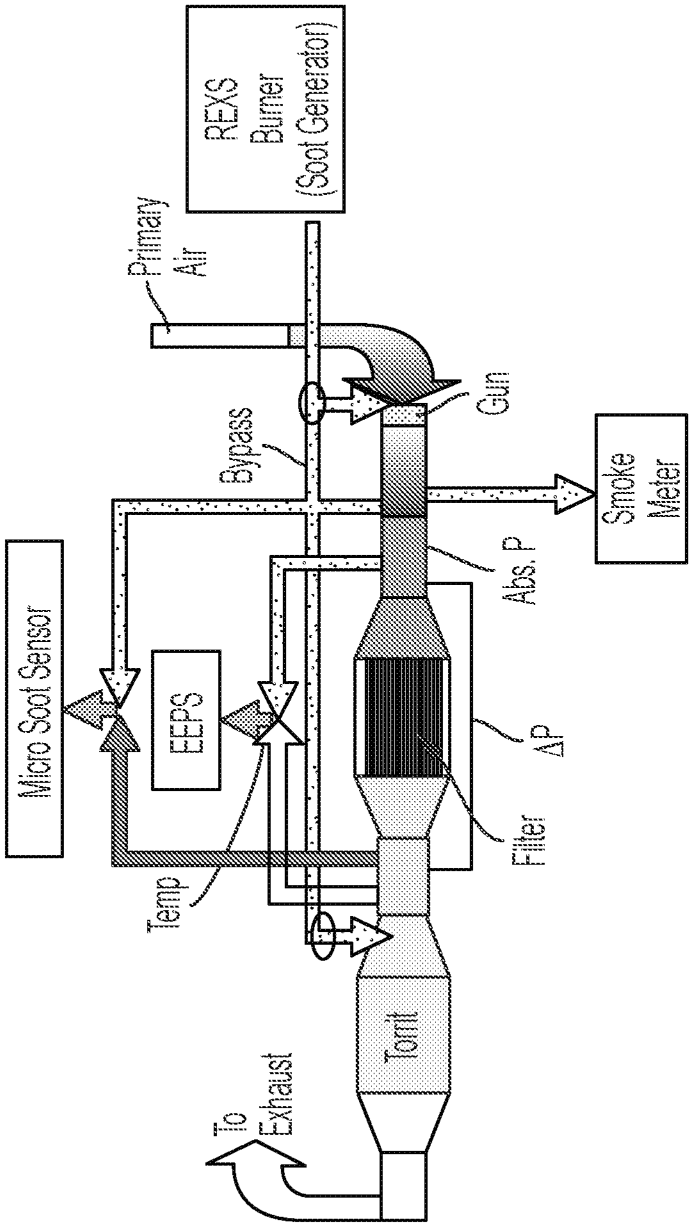
FIG. 15A schematically depicts an FE measurement system suitable for measuring clean and soot loaded FE.
Figure 15B:
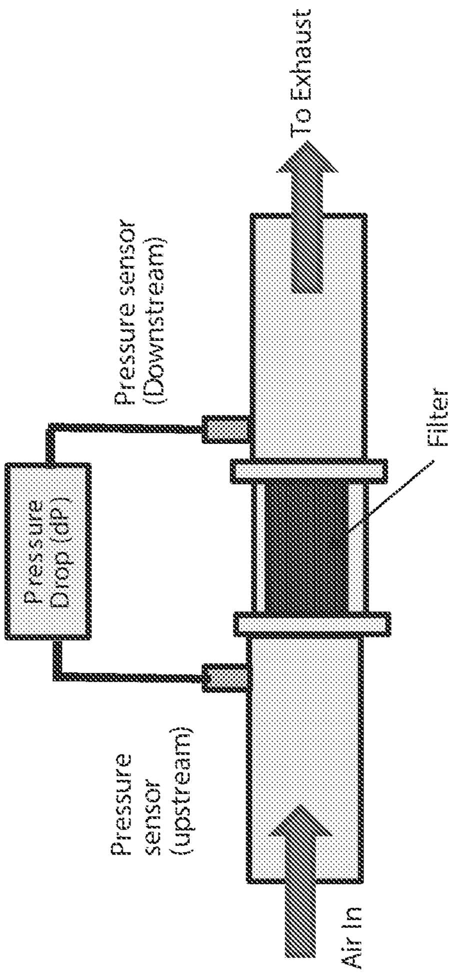
FIG. 15B schematically depicts a pressure drop (dP) measurement rig suitable for measuring pressure drop across a particulate filter.
Figure 15C:
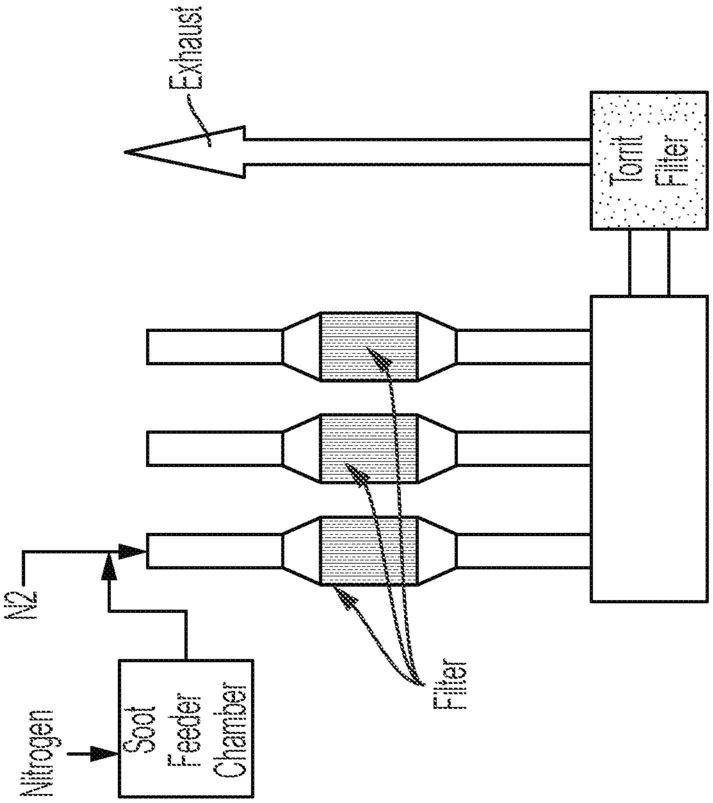
FIG. 15C schematically depicts an apparatus for loading soot onto one or more particulate filters.

FIG. 15A schematically depicts the setup used for the filtration efficiency measurement. The setup involves generation of soot using a propane burner (Reproducible Exhaust Simulator (REXS burner, Matter Engineering Inc.) that is then mixed with the primary air before the soot and air is introduced to the input pipe to the particulate filter. The particulate matter or soot generated by the REXS/CAST burners can have similar soot morphology, chemistry and size distribution to diesel engine generated soot, although for purposes of evaluation such soot can be injected into other types of particulate filters, such as gasoline particulate filters. For example, in SAE Paper No. 2018-01-0759 (2008) Kasper and Mosimann report REXS generated soot mobility size distribution comparable with diesel soot, with mobility mode diameter of 80 nm, lognormal geometric standard deviation of 1.8 and primary particle diameter of 20-35 nm. Soot concentration levels and primary air flow rates can be selected such that the total gas mass flow rates are similar to rates of interest for engine applications, such as ones encountered in light duty and heavy-duty diesel engine applications or gasoline particulate filter applications. To estimate the mass-based filtration efficiency, soot mass concentrations are measured upstream and downstream of the filter using AVLs photo-acoustic micro-soot sensor (MSS). Prior to testing, the two micro-soot sensors are calibrated with respect to each other by measuring the upstream soot concentration at different levels of primary gas dilution. The particulate filter is cleaned with compressed air and loaded on the measurement bench. The system is set in the bypass mode and the primary air is gradually increased to the desired level. The REXS burner is turned on and the system is allowed to stabilize still in the bypass mode. Soot concentration levels and the primary air flow rates are made depending upon the testing requirement. For the data reported here, the combined burner and primary air flowrate used is 365 SLPM (standard liter/min). The soot concentration level used is about 7 $mg/m^3$. The soot concentration downstream of the filter, as measured by MSS, is seen to start at a certain value and then gradually decreases to zero, as the deposited (accumulated) soot serves to enhance filtering. The time step for MSS measurements is set at $\delta t=1$ s. Defining the downstream concentration data from MSS as ($t'_k$ $C_{down,\ k}$; k=1, 2, . . . . N), the mass-based filtration efficiency at any given time $t'_k$ is calculated as, $$FE(t'_k) = 100 \times \left[1 - \left(\frac{c_{down,k}}{c_{up}}\right)\right]$$

where $C_{up}$ is the upstream concentration as measured by the micro-soot sensor. The corresponding filter soot loading per unit filter volume, SL, at any time, $t_k$, is estimated using the following relation:

$$SL(t'_k) = \frac{\sum_{j=1}^{k} Q_T\left(FE\left(t'_j\right)/100\right)c_{up}\delta t}{V_{filter}}$$

where $Q_T$ is the volumetric flow rate to the filter and $V_{filter}$ is the filter volume. As the soot deposits in the filter, the soot itself acts as an additional filtering medium resulting in the increase of filtration efficiency with time. The filtration efficiency gradually increases from clean filter efficiency to steady state efficiency, asymptotically reaching 100% efficiency at higher soot (particulate)

loadings. FIG. 15B schematically depicts a pressure drop (dP) measurement rig, or test bench, suitable for measuring pressure drop across a particulate filter. The bench comprises an arrangement to load the canned filter body, or 'part', using flanges in relation to pressure sensors upstream (of the filter inlet face) and downstream (of the filter outlet face) of the filter. The difference in pressure measured by upstream and downstream sensor is pressure drop ("Δp" or "dP"). A filter is cleaned with compressed air and loaded on the measurement bench. The air flowrate is chosen depending upon the testing requirement. For the data reported herein, the air flowrate used was 210 SCFM (standard $ft^3$/min) with the standard condition defined at 21.1° C. and 1 ATM. The pressure drop measured without any soot can be called clean dP or clean pressure drop. The pressure drop measured with soot can be called SLdP or soot loaded pressure drop. To measure the pressure drop of a filter with soot, the filters are separately loaded with the measured amount of soot and tested in the above rig. FIG. 15C shows the schematic of the soot loading rig. Artificial soot (Printex-U) was deposited into the filter using compressed nitrogen ($N_2$) as the carrier. A torrit dust collector was located downstream of the filter to trap any soot which passes through or penetrates the test filter. Each rig has a designated soot feeder which is connected to a funnel. Once soot is delivered to the funnel by an auger screw, the soot is pulled into the main exhaust pipe by a venturi system. Incremental soot loads can be generated in the filter with corresponding weight and pressure drop measured at each level to generate the SLdP profile. The flowrate of nitrogen used to load the soot in the data reported here was 16 $ft^3$/min.

In some embodiments the filter body disclose herein comprises porous filter walls, or porous wall portions of the filter body which comprise bulk porosity of 40 to 75% as measured by mercury porosimetry.

In some embodiments the porous wall portion comprises walls comprised of cordierite, aluminum titanate, silicon carbide, mullite, spinel, silica, alumina, silicon nitride, and combinations thereof.

In some embodiments the porous wall portion comprises walls arranged in a honeycomb structure of 100 to 900 cells per square inch.

Figure 16:
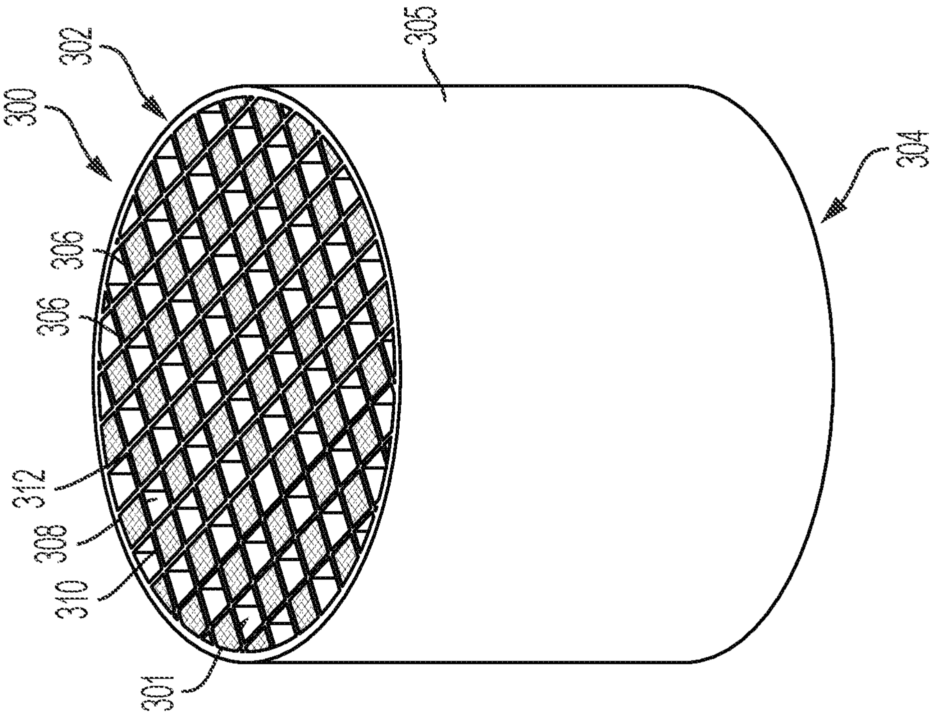
FIG. 16 schematically depicts an illustrative honeycomb body according to embodiments disclosed and described herein.

With reference now to FIG. 16, a honeycomb body 300 according to one or more embodiments shown and described herein is depicted. The honeycomb body 300 may, in embodiments, comprise a plurality of walls 306 defining a plurality of inner channels 301. The plurality of inner channels 301 and intersecting channel walls 306 extend between first end 302, which may be an inlet end, and second end 304, which may be an outlet end, of the plugged honeycomb body. The honeycomb body may have one or more of the channels plugged on one, or both of the first end 302 and the second end 304. The pattern of plugged channels of the honeycomb body is not limited. In some embodiments, a pattern of plugged and unplugged channels at one end of the plugged honeycomb body may be, for example, a checkerboard pattern where alternating channels of one end of the plugged honeycomb body are plugged. In some embodiments, plugged channels at one end of the plugged honeycomb body have corresponding unplugged channels at the other end, and unplugged channels at one end of the plugged honeycomb body have corresponding plugged channels at the other end.

In one or more embodiments, the plugged honeycomb body may be comprised of cordierite, aluminum titanate, enstatite, mullite, forsterite, corundum (SiC), spinel, sapphirine, or periclase, or combinations thereof. In general, cordierite has a composition according to the formula $Mg_2Al_4Si_5O_{18}$. In some embodiments, the pore size of the ceramic material, the porosity of the ceramic material, and the pore size distribution of the ceramic material are obtained in a controlled manner, for example by varying the particle sizes of the ceramic raw materials. In addition, pore formers can be included in ceramic batches used to form the plugged honeycomb body.

In some embodiments, walls of the plugged honeycomb body may have an average thickness from greater than or equal to 25 μm to less than or equal to 400 μm, such as from greater than or equal to 50 μm to less than or equal to 375 μm, greater than or equal to 75 μm to less than or equal to 350 μm, greater than or equal to 100 μm to less than or equal to 325 μm, greater than or equal to 125 μm to less than or equal to 300 μm, greater than or equal to 150 μm to less than or equal to 300 μm, greater than or equal to 150 μm to less than or equal to 275 μm, greater than or equal to 150 μm to less than or equal to 250 μm, or greater than or equal to 175 μm to less than or equal to 225 μm. The walls of the plugged honeycomb body can be described to have a base portion comprised of a bulk portion (also referred to herein as the bulk), and surface portions (also referred to herein as the surface). The surface portion of the walls extends from a surface of a wall of the plugged honeycomb body into the wall toward the bulk portion of the plugged honeycomb body. The surface portion may extend from 0 (zero) to a depth of about 5 μm into the base portion of the wall of the plugged honeycomb body. In some embodiments, the surface portion may extend about 5 μm, about 7 μm, or about 9 μm (i.e., a depth of 0 (zero)) into the base portion of the wall. The bulk portion of the plugged honeycomb body constitutes the thickness of wall minus the surface portions. Thus, the bulk portion of the plugged honeycomb body may be determined by the following equation: $t_{total}-2\ t_{surface}$ where $t_{total}$ is the total thickness of the wall and $t_{surface}$ is the thickness of the wall surface.

In one or more embodiments, the bulk of the plugged honeycomb body (prior to applying any filtration material) has a bulk median pore size from greater than or equal to 7 μm to less than or equal to 25 μm, such as from greater than or equal to 12 μm to less than or equal to 22 μm, or from greater than or equal to 12 μm to less than or equal to 18 μm. For example, in some embodiments, the bulk of the plugged honeycomb body may have bulk median pore sizes of about 10 μm, about 11 μm, about 12 μm, about 13 μm, about 14 μm, about 15 μm, about 16 μm, about 17 μm, about 18 μm, about 19 μm, or about 20 μm. Generally, pore sizes of any given material exist in a statistical distribution. Thus, the term "median pore size" or "d50" (prior to applying any filtration material) refers to a length measurement, above which the pore sizes of 50% of the pores lie and below which the pore sizes of the remaining 50% of the pores lie, based on the statistical distribution of all the pores. Pores in ceramic bodies can be manufactured by at least one of: (1) inorganic batch material particle size and size distributions; (2) furnace/heat treatment firing time and temperature schedules; (3) furnace atmosphere (e.g., low or high oxygen and/or water content), as well as; (4) pore formers, such as, for example, polymers and polymer particles, starches, wood flour, hollow inorganic particles and/or graphite/carbon particles.

In some specific embodiments, the median pore size (d50) of the bulk of the plugged honeycomb body (prior to applying any filtration material) is in a range of from 10 μm to about 16 μm, for example 13-14 μm, and the d10 refers to a length measurement, above which the pore sizes of 90% of the pores lie and below which the pore sizes of the remaining 10% of the pores lie, based on the statistical distribution of all the pores is about 7 μm. In specific embodiments, the d90 refers to a length measurement, above which the pore sizes of 10% of the pores of the bulk of the plugged honeycomb body (prior to applying any filtration material) lie and below which the pore sizes of the remaining 90% of the pores lie, based on the statistical distribution of all the pores is about 30 μm. In specific embodiments, the median diameter (D50) of the secondary particles or agglomerates is about 2 micrometers (μm, or "microns"). In specific embodiments, it has been determined that when the agglomerate median size D50 and the median wall pore size of the bulk honeycomb body d50 is such that there is a ratio of agglomerate median size D50 to median wall pore size of the bulk honeycomb body d50 is in a range of from 5:1 to 16:1, excellent filtration efficiency results and low pressure drop results are achieved. In more specific embodiments, a ratio of agglomerate median size D50 to median wall pore size of the bulk of honeycomb body d50 (prior to applying any filtration material) is in a range of from 6:1 to 16:1, 7:1 to 16:1, 8:1 to 16:1, 9:1 to 16:1, 10:1 to 16:1, 11:1 to 16:1 or 12:1 to 6:1 provide excellent filtration efficiency results and low pressure drop results.

In some embodiments, the bulk of the plugged honeycomb body may have bulk porosities, not counting a coating, of from greater than or equal to 50% to less than or equal to 75% as measured by mercury intrusion porosimetry. Other methods for measuring porosity include scanning electron microscopy (SEM) and X-ray tomography, these two methods in particular are valuable for measuring surface porosity and bulk porosity independent from one another. In one or more embodiments, the bulk porosity of the plugged honeycomb body may be in a range of from about 50% to about 75%, in a range of from about 50% to about 70%, in a range of from about 50% to about 65%, in a range of from about 50% to about 60%, in a range of from about 50% to about 58%, in a range of from about 50% to about 56%, or in a range of from about 50% to about 54%, for example.

In one or more embodiments, the surface portion of the plugged honeycomb body has a surface median pore size from greater than or equal to 7 μm to less than or equal to 20 μm, such as from greater than or equal to 8 μm to less than or equal to 15 μm, or from greater than or equal to 10 μm to less than or equal to 14 μm. For example, in some embodiments, the surface of the plugged honeycomb body may have surface median pore sizes of about 8 μm, about 9 μm, about 10 μm, about 11 μm, about 12 μm, about 13 μm, about 14 μm, or about 15 μm.

In some embodiments, the surface of the plugged honeycomb body may have surface porosities, prior to application of a filtration material deposit, of from greater than or equal to 35% to less than or equal to 75% as measured by mercury intrusion porosimetry, SEM, or X-ray tomography. In one or more embodiments, the surface porosity of the plugged honeycomb body may be less than 65%, such as less than 60%, less than 55%, less than 50%, less than 48%, less than 46%, less than 44%, less than 42%, less than 40%, less than 48%, or less than 36% for example.

Figure 17:
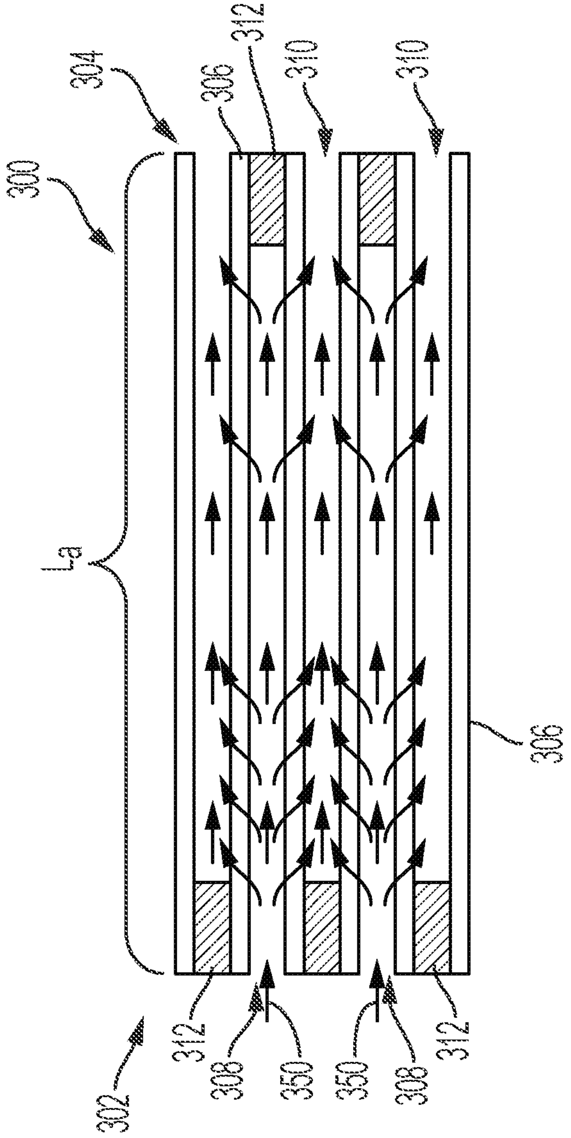
FIG. 17 schematically depicts a wall-flow particulate filter according to embodiments disclosed and described herein.

Referring now to FIGS. 16 and 17, a honeycomb body in the form of a particulate filter 300 is schematically depicted. The particulate filter 300 may be used as a wall-flow filter to filter particulate matter from an exhaust gas stream, such as an exhaust gas stream emitted from a gasoline engine, in which case the particulate filter 300 is a gasoline particulate filter. The particulate filter 300 generally comprises a honeycomb body having a plurality of channels 310 or cells which extend between an inlet end 302 and an outlet end 304, defining an overall length. The channels 310 of the particulate filter 300 are formed by, and at least partially defined by a plurality of intersecting channel walls 306 that extend from the inlet end 302 to the outlet end 304. The particulate filter 300 may also include a skin layer 305 surrounding the matrix of walls 306 and the plurality of channels 310. This skin layer 305 may be extruded during the formation of the channel walls 306 or formed in later processing as an after-applied skin layer, such as by applying a skinning cement to the outer peripheral portion of the channels.

In some embodiments described herein, the channel walls 306 of the particulate filter 300 may have a thickness of greater than about 2 mils (50 micrometers, or "microns"), or in some embodiments greater than about 4 mils (101.6 micrometers). For example, in some embodiments, the thickness of the channel walls 306 may be in a range from about 4 mils up to about 30 mils (762 micrometers). In some other embodiments, the thickness of the channel walls 306 may be in a range from about 6 mils (152 micrometers) to about 10 mils (253 micrometers). In some other embodiments, the thickness of the channel walls 206 may be in a range from about 7 mils (177 micrometers) to about 9 mils (228 micrometers).

In some embodiments of the particulate filter 200 described herein the channel walls 306 of the particulate filter 300 may have a bare open porosity (i.e., the porosity before any coating is applied to the plugged honeycomb body) $P \geq 35\%$ prior to the application of any coating to the particulate filter 300. In some embodiments the bare open porosity of the channel walls 306 may be such that $40\% \leq P \leq 75\%$. In other embodiments, the bare open porosity of the channel walls 306 may be such that $45\% \leq P \leq 75\%$, $50\% \leq P \leq 75\%$, $55\% \leq P \leq 75\%$, $60\% \leq P \leq 75\%$, $45\% \leq P \leq 70\%$, $50\% \leq P \leq 70\%$, $55\% \leq P \leq 70\%$, or $60\% \leq P \leq 70\%$.

Further, in some embodiments, the channel walls 306 of the particulate filter 300 are formed such that the pore distribution in the channel walls 306 has a median pore size of ≤30 μm ("microns") prior to the application of any coatings (i.e., bare). For example, in some embodiments, the median pore size may be ≥8 micrometers and less than or ≤30 micrometers. In other embodiments, the median pore size may be ≥10 micrometers and less than or ≤30 micrometers. In other embodiments, the median pore size may be ≥10 micrometers and less than or ≤25 micrometers. In some embodiments, particulate filters produced with a median pore size greater than about 30 micrometers have reduced filtration efficiency while with particulate filters produced with a median pore size less than about 8 micrometers may be difficult to infiltrate the pores with a washcoat containing a catalyst. Accordingly, in some embodiments, it is desirable to maintain the median pore size of the channel wall in a range of from about 8 micrometers to about 30 micrometers, for example, in a range of from 10 micrometers to about 20 micrometers.

In one or more embodiments described herein, the plugged honeycomb body of the particulate filter 300 is formed from a metal or ceramic material such as, for example, cordierite, silicon carbide, aluminum oxide, aluminum titanate or any other ceramic material suitable for use in elevated temperature particulate filtration applications.

For example, the particulate filter 300 may be formed from cordierite by mixing a batch of ceramic precursor materials which may include constituent materials suitable for producing a ceramic article which predominately comprises a cordierite crystalline phase. In general, the constituent materials suitable for cordierite formation include a combination of inorganic components including talc, a silica-forming source, and an alumina-forming source. The batch composition may additionally comprise clay, such as, for example, kaolin clay. The cordierite precursor batch composition may also contain organic components, such as organic pore formers, which are added to the batch mixture to achieve the desired pore size distribution. For example, the batch composition may comprise a starch which is suitable for use as a pore former and/or other processing aids. Alternatively, the constituent materials may comprise one or more cordierite powders suitable for forming a sintered cordierite honeycomb structure upon firing as well as an organic pore former material.

The batch composition may additionally comprise one or more processing aids such as, for example, a binder and a liquid vehicle, such as water or a suitable solvent. The processing aids are added to the batch mixture to plasticize the batch mixture and to generally improve processing, reduce the drying time, reduce cracking upon firing, and/or aid in producing the desired properties in the plugged honeycomb body. For example, the binder can include an organic binder. Suitable organic binders include water soluble cellulose ether binders such as methylcellulose, hydroxypropyl methylcellulose, methylcellulose derivatives, hydroxyethyl acrylate, polyvinylalcohol, and/or any combinations thereof. Incorporation of the organic binder into the plasticized batch composition allows the plasticized batch composition to be readily extruded. In some embodiments, the batch composition may include one or more optional forming or processing aids such as, for example, a lubricant which assists in the extrusion of the plasticized batch mixture. Exemplary lubricants can include tall oil, sodium stearate or other suitable lubricants.

After the batch of ceramic precursor materials is mixed with the appropriate processing aids, the batch of ceramic precursor materials is extruded and dried to form a green honeycomb body comprising an inlet end and an outlet end with a plurality of channel walls extending between the inlet end and the outlet end. Thereafter, the green honeycomb body is fired according to a firing schedule suitable for producing a fired honeycomb body. At least a first set of the channels of the fired honeycomb body can then be plugged in a predefined plugging pattern with a ceramic plugging composition and the honeycomb body is dried and/or heated to secure the plugs in the channels.

Figure 18:
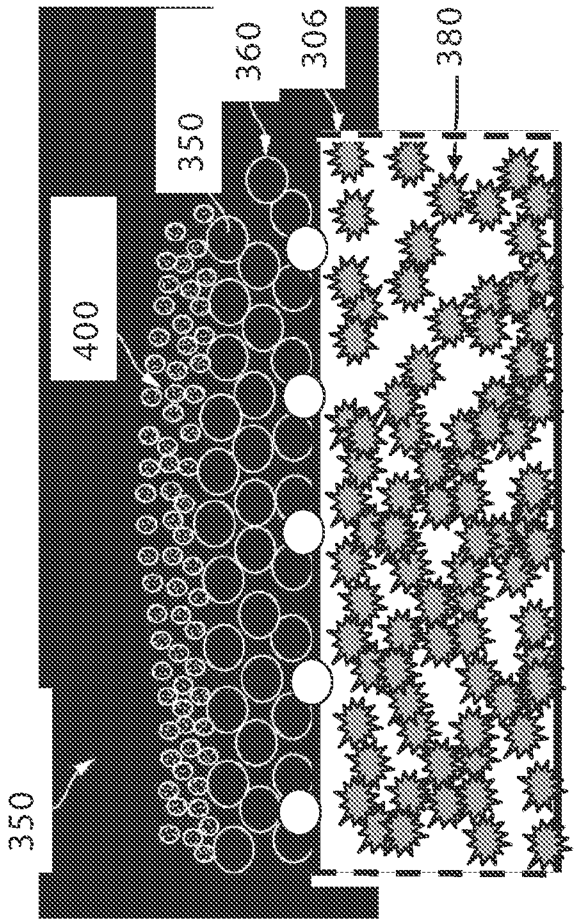
FIG. 18 schematically depicts relative positions of filtration material comprising filtration particles supported by honeycomb body wall which also supports catalyst material, the majority of which is disposed in-wall in the wall and spaced away from the filtration particles, such that at least some of the solid particulate matter carried in by an exhaust stream is trapped by the filtration particles.

In various embodiments the plugged honeycomb body is configured to filter particulate matter from a gas stream, for example, an exhaust gas stream from a gasoline engine. Accordingly, the median pore size, porosity, geometry and other design aspects of both the bulk and the surface of the plugged honeycomb body are selected taking into account these filtration requirements of the plugged honeycomb body. As an example, and as shown in FIGS. 16 and 17, a honeycomb body in the form of a particulate filter 300 is schematically depicted. The particulate filter 300 may be used as a wall-flow filter to filter particulate matter from an exhaust gas stream 350, such as an exhaust gas stream emitted from a gasoline engine, in which case the particulate filter 300 is a gasoline particulate filter. The particulate filter 300 generally comprises a honeycomb body having a plurality of channels 301 or cells which extend between an inlet end 302 and an outlet end 304, defining an overall length La. The channels 301 of the particulate filter 300 are formed by, and at least partially defined by a plurality of intersecting channel walls 306 that extend from the inlet end 302 to the outlet end 304. The particulate filter 300 may also include a skin layer 305 surrounding the plurality of channels 301. This skin layer 305 may be extruded during the formation of the channel walls 306 or formed in later processing as an after-applied skin layer, such as by applying a skinning cement to the outer peripheral portion of the channels. An axial cross section of the particulate filter 300 of FIG. 16 is shown in FIG. 17, i.e. a cross section in a plane perpendicular to a longitudinal axis extending from the inlet face to the outlet face of the honeycomb body. In some embodiments, certain channels are designated as inlet channels 308 and certain other channels are designated as outlet channels 310. In some embodiments of the particulate filter 300, at least a first set of channels may be plugged with plugs 312. Generally, the plugs 312 are arranged proximate the ends (i.e., the inlet end or the outlet end) of the channels 301. The plugs are generally arranged in a pre-defined pattern, such as in the checkerboard pattern shown in FIG. 16, with every other channel being plugged at an end. The inlet channels 308 may be plugged at or near the outlet end 304, and the outlet channels 310 may be plugged at or near the inlet end 302 on channels not corresponding to the inlet channels. Accordingly, each cell may be plugged at or near one end of the particulate filter only. FIG. 17 generally depicts a checkerboard plugging pattern, however alternative plugging patterns may be used in the porous ceramic honeycomb article. In some embodiments described herein, the particulate filter 300 may be formed with a channel density of up to about 600 channels per square inch (cpsi). For example, in some embodiments, the particulate filter 300 may have a channel density in a range from about 100 cpsi to about 600 cpsi. In some other embodiments, the particulate filter 300 may have a channel density in a range from about 100 cpsi to about 400 cpsi or even from about 200 cpsi to about 300 cpsi. In some embodiments described herein, the channel walls 306 of the particulate filter 300 may have a thickness of greater than about 4 mils (101.6 micrometers). For example, in some embodiments, the thickness of the channel walls 306 may be in a range from about 4 mils up to about 30 mils (762 micrometers). In some other embodiments, the thickness of the channel walls 306 may be in a range from about 6 mils (152 micrometers) to about 10 mils (253 micrometers). In some other embodiments, the thickness of the channel walls 306 may be in a range from about 7 mils (177 micrometers) to about 9 mils (228 micrometers). FIG. 18 schematically depicts relative positions of filtration material 360 comprising filtration particles 350 supported by honeycomb body wall 306 which also supports catalyst material 380, the majority of which is disposed in-wall in the wall 306 and spaced away from the filtration particles 350, such that at least some of the solid particulate matter 400 carried in by an exhaust stream 350 is trapped by the filtration particles 350.

The filtration particles or filtration material, which in some portions or some embodiments may be an inorganic layer, on walls of the plugged honeycomb body is in some embodiments preferably very thin compared to thickness of the base portion of the walls of the plugged honeycomb body. The material, which may be an inorganic layer, on the plugged honeycomb body can be formed by methods that permit the deposited material to be applied to surfaces of walls of the plugged honeycomb body in very thin applications or in some portions, layers. In embodiments, the average thickness of the material, which may be deposit regions or an inorganic layer, on the base portion of the walls of the plugged honeycomb body is greater than or equal to 0.5 μm and less than or equal to 50 μm, or greater than or equal to 0.5 μm and less than or equal to 45 μm, greater than or equal to 0.5 μm and less than or equal to 40 μm, or greater than or equal to 0.5 μm and less than or equal to 35 μm, or greater than or equal to 0.5 μm and less than or equal to 30 μm, greater than or equal to 0.5 μm and less than or equal to 25 μm, or greater than or equal to 0.5 μm and less than or equal to 20 μm, or greater than or equal to 0.5 μm and less than or equal to 15 μm, greater than or equal to 0.5 μm and less than or equal to 10 μm. In one or more embodiments, the inorganic material comprises alumina.

In another set of embodiments disclosed herein, a filter body is disclosed comprising a porous honeycomb structure comprised of porous filter walls, filtration particles supported by the porous filter walls, and catalytic material, wherein the structure comprises a matrix of the filter walls configured as a cellular honeycomb structure comprised of cells, wherein surfaces of the filter walls define channels comprising inlet channels and outlet channels extending from an inlet end to an outlet end of the filter structure, wherein the filter structure comprises a first group of plugs disposed within and sealing the inlet channels at or near the outlet end and a second group of plugs disposed within and sealing the outlet channels at or near the inlet end, wherein the porous filter walls comprise opposing first and second wall surfaces, and wherein the filtration particles are disposed in the filter walls and/or on the filter walls at or near the first wall surfaces, wherein the catalytic material is disposed in the porous filter walls and/or on the second surfaces of the porous filter walls, wherein the catalyst loading is disposed predominantly in-wall within the filter walls, and wherein the second surfaces define the outlet channels; in some of these embodiments, the filter body has a clean filtration efficiency at 0.0 particulate loading of greater than 80%, the filter body has a catalyst loading of 40 to 50 g/L of catalyst material per volume of filter body, the catalyst loading is disposed predominantly in-wall within the filter walls, the filter body exhibits a clean filtration efficiency at 0.0 g/L particulate loading of greater than 92%, and the filter body exhibits a ratio of pressure drop at 0.5 g/L soot particulate loading to pressure drop at 0 g/L soot particulate loading of 1.01 to 1.15; in some of these embodiments, the filter body has a catalyst loading of 50 to 90 g/L of catalyst material per volume of filter body, the catalyst loading is disposed predominantly in-wall within the filter walls, the filter body exhibits a clean filtration efficiency at 0.0 g/L particulate loading of greater than 88%, and the filter body exhibits a ratio of pressure drop at 0.5 g/L soot particulate loading to pressure drop at 0 g/L soot particulate loading of 1.01 to 1.20; in some of these embodiments, the filter body has a catalyst loading of 90 to 150 g/L of catalyst material per volume of filter body, the catalyst loading is disposed predominantly in-wall within the filter walls, the filter body exhibits a clean filtration efficiency at 0.0 g/L particulate loading of greater than 85%, and the filter body exhibits a ratio of pressure drop at 0.5 g/L soot particulate loading to pressure drop at 0 g/L soot particulate loading of 1.01 to 1.25; in some of these embodiments, the filter body has a catalyst loading of 40 to 50 g/L of catalyst material per volume of filter body, the catalyst loading is disposed predominantly in-wall within the filter walls, the filter body exhibits a clean filtration efficiency at 0.0 g/L particulate loading of greater than 94%, and the filter body exhibits a ratio of pressure drop at 0.5 g/L soot particulate loading to pressure drop at 0 g/L soot particulate loading of 1.01 to 1.10; in some of these embodiments, the filter body has a catalyst loading of 50 to 90 g/L of catalyst material per volume of filter body, the catalyst loading is disposed predominantly in-wall within the filter walls, the filter body exhibits a clean filtration efficiency at 0.0 g/L particulate loading of greater than 90%, and the filter body exhibits a ratio of pressure drop at 0.5 g/L soot particulate loading to pressure drop at 0 g/L soot particulate loading of 1.01 to 1.15; in some of these embodiments, the filter body has a catalyst loading of 90 to 150 g/L of catalyst material per volume of filter body, the catalyst loading is disposed predominantly in-wall within the filter walls, the filter body exhibits a clean filtration efficiency at 0.0 g/L particulate loading of greater than 88%, and the filter body exhibits a ratio of pressure drop at 0.5 g/L soot particulate loading to pressure drop at 0 g/L soot particulate loading of 1.01 to 1.20.

As described above, the reference filter body performance characteristics are for a filter size of 4.66" (diameter)×5" (length), CPSI of 300, web thickness of 8 mil, and TWC bulk density of 1600 g/m3. For filter performance characteristics of filters of other filter geometries, microstructures, and/or catalyst material, the product performance characteristics as claimed herein can be determined by normalization.

As used herein "reference filter body" means a filter body having features of the porous honeycomb structure as present in the target filter body except that the reference filter body has reference geometrical and microstructural features, namely a reference cell density of 300 cells per square inch, a reference average wall thickness of 8 mils, and the reference filter body has a diameter of 4.66" inches and an axial length of 5 inches, and a catalyst loading bulk density of 1600 g/m$^3$. Thus, for filter bodies which differ from the reference filter body, the filter performance can be normalized to reflect differences in filter size, CPSI, web thickness, and/or catalyst loading per filter matrix volume, in order to evaluate a target filter body with respect to the features and/or performance as claimed in this disclosure.

Thus a comparison evaluation can be made for both FE (filtration efficiency) and dP (pressure drop) performance of filters having different geometries and sizes, as those skilled in the art can normalize results of a target filter body to take into account the impact of size, CPSI and web thickness differences and washcoat density, as appropriate. For such normalization, channel scale 1D FE (SAE 2012-01-0363) and dP (SAE 200-01-0184) models are used for filtration efficiency and pressure drop normalizations, respectively. Normalization for pressure drop of the target filter body is started by selecting an initial estimate of coated wall permeability; the SAE 200-01-0184 dP model is then used with inputs of specific geometry, size and test condition for the target filter body in order to predict pressure drop. If the model predicted pressure drop doesn't match the ("experimentally") measured value of pressure drop for the target filter body, the difference in those pressure drop values are used to calculate a new estimate of the wall permeability. This iterative process is continued until arriving at a wall permeability value that provides matching of the experimental and modeling results. This equivalent or "extracted" permeability thus provides a good representative value for the actual permeability of the target filter wall. This extracted wall permeability will then be used as input to the model, in combination with the target filter size, geometry and test condition as described in this disclosure (4.66" diameter×5" length, CPSI of 300, web thickness of 8 mil) to calculate the pressure drop performance under those conditions. The filtration efficiency (FE) normalization is conducted similarly, however instead of extracting a coated permeability as done for dP, for FE the coated equivalent d50 is extracted and used for the normalization. Thus, those skilled in the art can normalize the catalyst (washcoat) loading if the target filter body comprises a catalyst material with a bulk density different than the reference bulk density described in this disclosure (i.e. bulk density of 1600 g/m3) to arrive at an equivalent catalyst loading (g/L of filter matrix volume) to compare with the described features/performance in the claims of this disclosure.

Reference throughout this specification to "one embodiment," "certain embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Although the disclosure herein has been described with reference to particular embodiments, those skilled in the art will understand that the embodiments described are merely illustrative of the principles and applications of the present disclosure. It will be apparent to those skilled in the art that various modifications and variations can be made to the method and apparatus of the present disclosure without departing from the spirit and scope of the disclosure. Thus, the present disclosure can include modifications and variations that are within the scope of the appended claims and their equivalents.

What is claimed is:

1. A method of making a catalytically active particulate filter body, the method comprising:

directing a plurality of agglomerates of inorganic nanoparticles and binder material into an inlet end of a ceramic honeycomb body with a carrier gas, the ceramic honeycomb body comprising a plurality of intersecting porous walls forming a plurality of channels extending axially from the inlet end of the ceramic honeycomb body to an outlet end of the ceramic honeycomb body, the plurality of channels comprising a first plurality of inlet channels plugged by a plugging material at or proximate the outlet end and a second plurality of outlet channels plugged by the plugging material at or proximate the inlet end, the first plurality of inlet channels defined by first surfaces of the plurality of porous walls forming the inlet channels and the second plurality of outlet channels defined by second surfaces of the plurality of porous walls forming the outlet channels, the plurality of inorganic nanoparticles and the binder material depositing on the first surfaces as a porous filtration layer;

heat treating the porous filtration layer by heating the ceramic honeycomb body to one or more filtration heat treatment temperatures less than or equal to 500° C. for greater than 0.5 hours and less than 10 hours;

depositing a catalytic material onto the second surfaces such that the catalytic material is disposed on, in, or both on and in the porous walls forming the outlet channels; and heating the ceramic honeycomb body after the depositing the catalytic material for a time and at one or more temperatures sufficient to calcine the catalytic material and form the catalytically active particulate filter body.

2. The method of claim 1, wherein the depositing the catalytic material comprises depositing successive loads of the catalytic material.

3. The method of claim 1, wherein the depositing the catalytic material comprises depositing a selected amount of the catalytic material, and a loading of the catalytic material on the ceramic honeycomb body after the depositing is between 1 and 500 g/liter of the catalytic material per volume of the ceramic honeycomb body.

4. The method of claim 1, wherein the depositing the catalytic material comprises applying a catalyst material slurry to the second surfaces.

5. The method of claim 1, wherein the binder material comprises a silicon-containing material.

6. The method of claim 1, wherein the heating the ceramic honeycomb body after the depositing the catalytic material comprises heating the ceramic honeycomb body to a temperature greater than 500° C. for greater than 1 hour.

* * * * *